(12) United States Patent
Ramasubramonian et al.

(10) Patent No.: US 11,825,120 B2
(45) Date of Patent: Nov. 21, 2023

(54) SUBBLOCK CODING BY GENERALIZED INTRA PREDICTION IN VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Cheng-Teh Hsieh, Del Mar, CA (US); Vadim Seregin, San Diego, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 16/800,467

(22) Filed: Feb. 25, 2020

(65) Prior Publication Data
US 2020/0280742 A1    Sep. 3, 2020

Related U.S. Application Data

(60) Provisional application No. 62/862,936, filed on Jun. 18, 2019, provisional application No. 62/817,474, filed on Mar. 12, 2019, provisional application No. 62/812,078, filed on Feb. 28, 2019.

(51) Int. Cl.
| | | |
|---|---|---|
| *H04N 7/12* | (2006.01) | |
| *H04N 19/645* | (2014.01) | |
| *H04N 19/174* | (2014.01) | |
| *H04N 19/176* | (2014.01) | |
| *H04N 19/159* | (2014.01) | |
| *H04N 19/436* | (2014.01) | |
| *H04N 19/189* | (2014.01) | |

(52) U.S. Cl.
CPC ......... *H04N 19/645* (2014.11); *H04N 19/159* (2014.11); *H04N 19/174* (2014.11); *H04N 19/176* (2014.11); *H04N 19/189* (2014.11); *H04N 19/436* (2014.11)

(58) Field of Classification Search
CPC .................................................... H04N 19/119
See application file for complete search history.

(56) References Cited

PUBLICATIONS

Bossen F., et al., "Non-CE3: A Unified Luma Intra Mode list Construction Process", Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

(Continued)

*Primary Examiner* — Y Lee
(74) *Attorney, Agent, or Firm* — Shumaker & Sieffert, PA

(57) ABSTRACT

A video coder may be configured to code video data by performing splitting of a coding unit (CU) of video data using intra sub-partition (ISP) to form a set of prediction blocks. The video coder may group a plurality of the prediction blocks from the set of prediction blocks into a first prediction block group (PBG). The video coder may reconstruct samples of prediction blocks included in the first PBG independently of samples of other prediction blocks included in the first PBG.

28 Claims, 27 Drawing Sheets

(56) References Cited

PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V2, 248 Pages.

Bross B., et al., "Versatile Video Coding (Draft 7)", Joint Video Experts Team (JVET) of ITU-T SG 16 WP 3 and ISO/IEC JTC 1/SC 29/WG 11, Document: JVET-P2001-VA, 16th Meeting: Geneva, CH, Oct. 1-11, 2019, 495 Pages.

Yao S., et al., "Non-CE3: Intra Prediction Information Coding", Joint Video Experts Team (JVET) of ITU-T SG 16 WP 3 and ISO/IEC JTC 1/SC 29/WG 11, Document: JVET-M0210-V3, 13th Meeting: Marrakech, MA, Jan. 9-18, 2019, JVET-M0210-r2, pp. 1-7.

Bross B., et al., "Versatile Video Coding (Draft 8)", Joint Video Experts Team (JVET) of ITU-T SG 16 WP 3 and ISO/IEC JTC 1/SC 29/WG 11, Document: JVET- Q2001-VB, 17th Meeting: Brussels, BE, Jan. 7-17, 2020, 523 Pages.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ , No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)OF ITU_T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, p. i-iv, Retrieved from the Internet: URL: http://phenix.int-evry.fr/jvet/doc_end_user/documents/7_Torino/wg11/JVET-G0001-v1.zip, p. 20, Paragraph 2.3.7 - p. 23, Paragraph 2.3.7.6, p. 17, Paragraph 2.3.5—p. 18, section 2.

Ergen S., "ZigBee/IEEE 802.15.4 Summary", Sep. 10, 2004, 37 Pages.

Hernandez S., et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.

Hernández S-D., et al., "CE3: Line-based intra coding mode (Tests 2.1.1 and 2.1.2)", 12th JVET Meeting, Oct. 3-12, 2018, Macao, CN, (The Joint Video Exploration Team OF ISO/IEC JTC1/SC29/WG11 and ITU-T SG.16), No. JVET-L0076-V2, Fraunhofer HHI, pp. 1-10.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ohm J-R., et al., "MPEG-4 Advanced Video Coding", MPEG Doc#: N7314, Jul. 2005, 11 Pages.

Ramasubramonian A., et al., "AHG16/Non-CE3: On 1xN and 2xN Subpartitions in Intra Subpartition Coding ", Joint Video Experts Team (JVET) of ITU-T SG 16 WP 3 and ISO/IEC JTC 1/SC 29/WG 11, Document: JVET- N0432-V2, 14th Meeting: Geneva, CH, Mar. 19-27, 2019, pp. 1-4.

Ramasubramonian A., et al., "CE3-1.6: On 1xN and 2xN Subblocks of ISP", Joint Video Experts Team (JVET) of ITU-T SG 16 WP 3 and ISO/IEC JTC 1/SC 29/WG 11, Document: JVET-O0106-V2, 15th Meeting: Gothenburg, SE, Jul. 3-12, 2019, pp. 1-4.

Cao X., et al., "Short Distance Intra Coding Scheme for High Efficiency Video Coding", IEEE Transactions on Image Processing, IEEE Service Center, Piscataway, NJ, US, vol. 22, No. 2, Feb. 1, 2013, XP011492284, pp. 790-801.

Tan Y. H., et al., "On Residual Quad-tree Coding in HEVC", Multimedia Signal Processing (MMSP), 2011 IEEE 13th International Workshop ON, IEEE, Oct. 17, 2011 (Oct. 17, 2011), pp. 1-4, XP032027545, DOI: 10.1109/MMSP.2011.6093805 ISBN: 978-1-4577-1432-0, Sections 1-4.

International Search Report and Written Opinion—PCT/US2020/019919—ISA/EPO—dated Jun. 4, 2020.

De-Luxan-Hernandez S., et al., "CE3-Related: Improvement on the Intra Sub-Partitions Coding Mode," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0426-v1, pp. 1-4.

JVET: "VTM-5.0, Tags, JVET/VVCSoftware_VTM, GitLab", Frank Bossen, https://vcgit.hhi.fraunhofer.de/jvet/ VVCSoftware_VTM/-/tags/VTM-5.0, Accessed Jul. 2019, pp. 1-3.

Zhao J., et al., "CE6: Parallel Prediction Unit for Parallel Intra Coding", Joint Collaborative Team on Video Coding (JCT-VC) of ITU-T SG16 WP3 and ISO/IEC JTC1/SC29/WG11, 4th JCT-VC Meeting, Daegu, Korean, Jan. 20, 2011-Jan. 28, 2011, No. JCTVC-0074, Jan. 20, 2011, XP030226459, 10 Pages.

Zhao J., et al., "CE6.d: Parallel Intra Coding", Joint Collaborative Team on Video Coding (JCT-VC) of ITU-T SG16 WP3 and ISO/IEC JTC1/SC29/WG11, 6th JCTVC Meeting, Torino, IT, Jul. 14, 2011-Jul. 22, 2011, No. JCTVC-F605, Jul. 2, 2011, XP030228000, 5 Pages.

| predModeIntra | -10 | -9 | -9 | -7 | -6 | -5 | -4 | -3 | -2 | -1 | | | | -14 | -13 | -12 | -11 |
|---|---|---|---|---|---|---|---|---|---|---|---|---|---|---|---|---|---|
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | -1 | -2 | -3 | -4 | -6 | -8 | -10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | -12 | -14 | -16 | -18 | -20 | -23 | -26 | -29 | -32 | -29 | -26 | -23 | -20 | -18 | -16 | -14 | -12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | -10 | -8 | -6 | -4 | -3 | -2 | -1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

FIG. 7

SUBBLOCK CODING BY GENERALIZED INTRA PREDICTION IN VIDEO CODING

This application claims the benefit of U.S. Provisional Patent Application No. 62/812,078, filed Feb. 28, 2019, U.S. Provisional Patent Application No. 62/817,474, filed Mar. 12, 2019, and U.S. Provisional Patent Application No. 62/862,936, filed Jun. 18, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding (e.g., video encoding and/or video decoding) typically involves predicting a block of video data from either an already coded block of video data in the same picture (e.g., intra prediction) or an already coded block of video data in a different picture (e.g., inter prediction). Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to the coding of multiple prediction blocks into prediction block groups using intra sub-partition (ISP) coding. In particular, a video coder (e.g., video encoder and/or video decoder) may group multiple prediction blocks, such as multiple subblocks of a coding unit, into prediction block groups. For example, a single prediction block group may include more than one prediction block or subblock of the coding unit. In one example, a first prediction block group may include a first subblock of a coding unit and a second subblock of the coding unit.

In some examples, a video coder may reconstruct samples of prediction blocks included in the first prediction block group independently of the reconstruction of samples of other prediction blocks included in that same prediction block group. For example, the video coder may reconstruct samples of one prediction block before, without, or in parallel with, the reconstruction of samples of another prediction block included in the same prediction block group. In some instances, the prediction block grouping techniques of this disclosure may be implemented when instances of intra sub-partition coding are used to include splitting of coding units, such as vertical splitting, horizontal splitting, a combination of horizontal splitting and vertical splitting, etc. Furthermore, the prediction block grouping techniques of this disclosure may be implemented when the prediction block has a relatively narrow dimension (e.g., narrow height, narrow width, etc.), such that the dimensions of the prediction block satisfy a predefined threshold for prediction block grouping. One or more techniques described herein for grouping prediction blocks into prediction block groups, may be applied to any of the existing video codecs, such as HEVC (High Efficiency Video Coding) or H.266/Versatile Video Coding (VVC) standard, or may be used in any future video coding standards.

According to one example, a method of coding video data is disclosed. The method comprises performing splitting of a coding unit (CU) of video data using intra sub-partition (ISP) to form a set of prediction blocks, the prediction blocks including at least a first prediction block and a second prediction block; grouping a plurality of prediction blocks from the set of prediction blocks into a first prediction block group (PBG); and reconstructing samples of prediction blocks included in the first PBG independently of samples of other prediction blocks included in the first PBG.

According to another example, a device for coding video data is disclosed. The device includes a memory configured to store video data and one or more processors implemented in circuitry and configured to perform splitting of a coding unit (CU) of video data using intra sub-partition (ISP) to form a set of prediction blocks, the prediction blocks including at least a first prediction block and a second prediction block; group a plurality of prediction blocks from the set of prediction blocks into a first prediction block group (PBG); and reconstruct samples of prediction blocks included in the first PBG independently of samples of other prediction blocks included in the first PBG.

According to another example, a non-transitory computer-readable storage medium is disclosed. The non-transitory computer-readable storage medium has stored thereon instructions that, when executed, cause one or more processors to: perform splitting of a coding unit (CU) of video data using intra sub-partition (ISP) to form a set of prediction blocks, the prediction blocks including at least a first prediction block and a second prediction block; group a plurality of prediction blocks from the set of prediction blocks into a first prediction block group (PBG); and reconstruct samples of prediction blocks included in the first PBG independently of samples of other prediction blocks included in the first PBG.

According to another example, an apparatus for coding video data is disclosed. The apparatus includes means for performing splitting of a coding unit (CU) of video data using intra sub-partition (ISP) to form a set of prediction blocks, the prediction blocks including at least a first prediction block and a second prediction block; grouping a plurality of prediction blocks from the set of prediction blocks into a first prediction block group (PBG); and reconstructing samples of prediction blocks included in the first PBG independently of samples of other prediction blocks included in the first PBG.

The details of one or more examples are set forth in the accompanying drawings and the description below. Other features, objects, and advantages of the techniques described in this disclosure will be apparent from the description, drawings, and claims.

BRIEF DESCRIPTION OF DRAWINGS

FIG. 7 is a table that specifies the mapping table between predModeIntra and the angle parameter intraPredAngle in VTM3.

DETAILED DESCRIPTION

Figure 1:
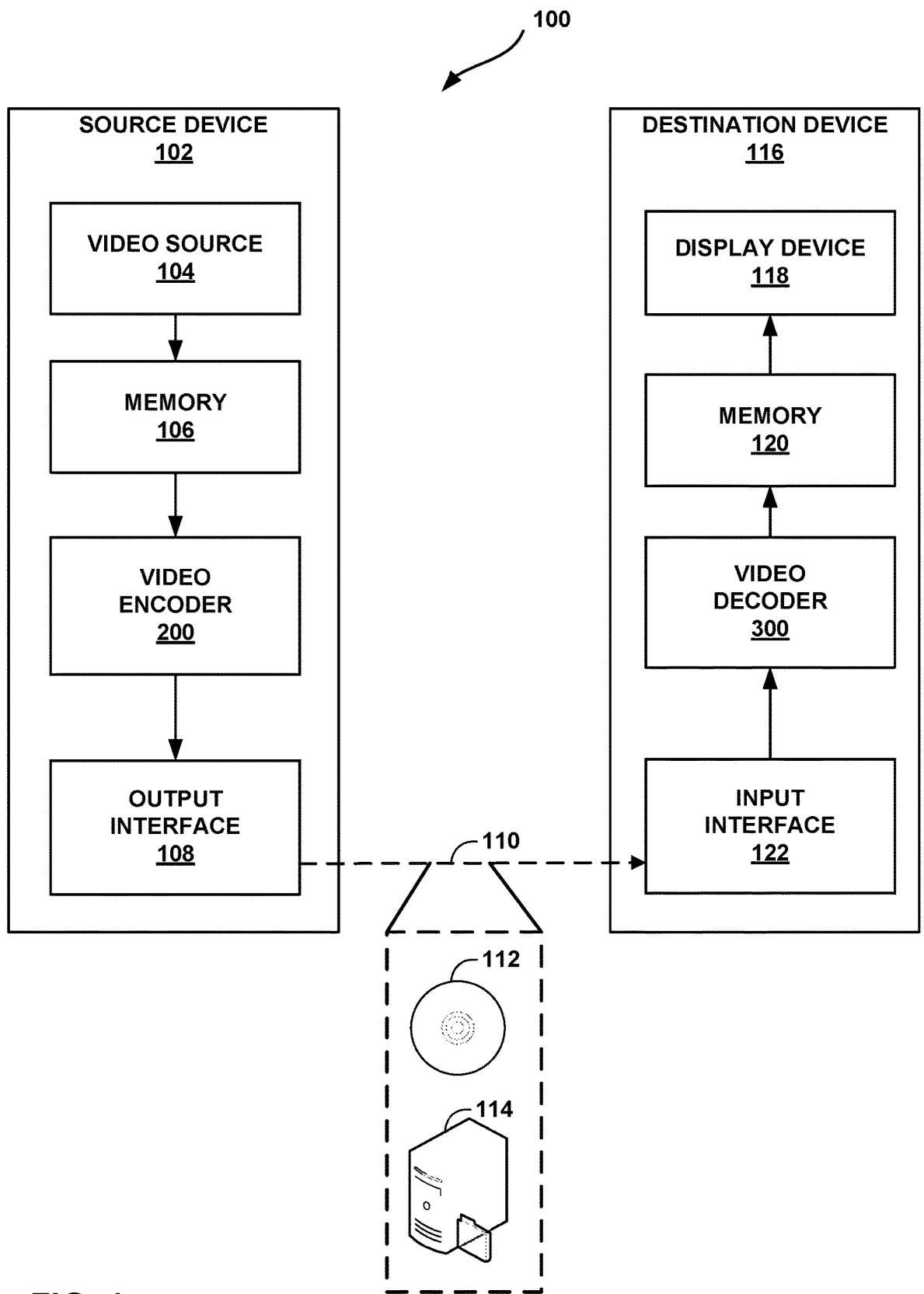
FIG. 1 is a block diagram illustrating an example video encoding and decoding system that may perform the techniques of this disclosure.

In general, this disclosure describes techniques related to improvements to the coding and/or decoding of prediction blocks using prediction block groups in intra sub-partition (ISP) coding. Such techniques may be applied to current or future video coding standards, including the Versatile Video Coding (VVC) standard presently under development.

In some examples, a video coder may code blocks of video data using ISP coding. For example, the video coder may partition blocks of video data into subblocks (e.g., prediction blocks). In some examples, the subblocks may have a relatively narrow size in one or more dimensions. In an illustrative example, a coding unit (CU), such as a coding block, may have the dimensions of Width (W)×Height (H). In one example, the W of the CU may be equal to 4 and H may be equal to N>0. In the illustrative example, a video coder may code the CU of 4×N using ISP coding. For example, the video coder may use vertical splitting or horizontal splitting to partition the CU. In another example, the video coder may use a combination of vertical splitting and horizontal splitting. In such instances, the video coder may partition a first one or more parts of the CU using vertical splitting and a second one or more parts of the same CU using horizontal splitting.

In an example involving vertical splitting, the resultant subblocks may have a size of 1×N. In addition, N may be greater than 8 (e.g., H is greater than 8). In such examples, the video coder may utilize row-wise storage of samples. When a video coder uses row-wise storage of samples, narrow subblocks, such as those having a dimension below a predefined threshold, may result in the video coder performing inefficient and time-consuming memory access procedures. For example, in such instances, the video coder, when performing a memory access procedure, may then access (e.g., read) a higher number of samples from memory compared to the number of samples in the subblock. When a block is of size M×N, accessing the M samples in each row from memory may often involve an overhead, such as accessing more than M samples due to limitations on the minimum number of samples per access. For example, a given memory access procedure may require a video coder to read samples of a first row before reading samples from another row. In such examples, the video coder may then read a minimum of X samples before accessing a target sample in one narrow subblock, where X is greater than the number of samples in that narrow subblock. Due to the narrow shape of 1×N and 2×N subblocks, this problem is exacerbated as the number of rows is larger for narrow subblocks. For example, a 4×4 CU may only have four rows. In such examples, a video coder may need to access 16 rows for a 1×16 subblock, even though the subblock has the same number of samples as the 4×4 CU. The resultant overhead may cause a video coder to experience delays during the coding process, particularly in the worst case where there are several small coding blocks in high resolution sequences. In addition, the reconstruction of a subblock in the CU is dependent on the reconstruction of other subblocks in the coding block that precede in decoding order. In such instances, a video coder is likely to experience an increased delay in coding or decoding the CU due to subblocks of this nature.

The aforementioned issues, among others, may be addressed by the disclosed prediction block grouping techniques by grouping prediction blocks (e.g., subblocks) into prediction block groups (PBGs) and reconstructing samples of prediction blocks included in one PBG independently of samples of other prediction blocks included in the same PBG. Specifically, a coding unit may be split vertically, horizontally, or a combination of horizontally and vertically, using intra sub-partition (ISP) to form the prediction blocks that may then be grouped into various PBGs.

Various techniques in this disclosure may be described with reference to a video coder or with reference to video coding, which are intended to be generic terms that can refer to either a video encoder and video encoding or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for generalized intra prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for generalized intra prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to computer-readable medium 110 (e.g., storage device 112). Similarly, destination device 116 may access encoded data from computer-readable medium 110 (e.g., storage device 112) via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-M1001-v2 (hereinafter 437 VVC Draft 4). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication. This disclosure may generally use the term partition to represent a block as a TU, PU, or CU, or to represent a plurality of blocks or region that includes multiple blocks.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder

200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may perform generalized intra prediction. For instance, video encoder 200 and/or video decoder 300 may code an indication of the performance of generalized prediction for a current coding block of video data; split, based on the indication, the current coding block into one or more prediction blocks; define, based on the one or more prediction blocks, one or more prediction block groups (PBGs); determine a coding order of the PBGs; and code the PBGs in the coding order.

In some examples, a video coder (e.g., video encoder 200 and/or video decoder 300) may perform splitting of a coding unit (CU) of video data using intra sub-partition (ISP) to form a set of prediction blocks. For example, the video coder may perform vertical splitting or horizontal splitting of the CU. In another example, the video coder may perform splitting of the CU as a combination of vertical splitting and horizontal splitting of the CU. For example, the video coder may perform vertical splitting on parts of the CU and perform horizontal splitting on other parts of the CU. In any case, the video coder may split the CU, via various splitting or partitioning techniques, to form a set of prediction blocks.

In some examples, the prediction blocks may include at least a first prediction block and a second prediction block. In some examples, a CU may include a single prediction block. The prediction blocks may include narrow vertical blocks, narrow horizontal blocks, or a combination of vertical blocks and horizontal blocks. It should be noted that the term "narrow" in this context generally includes non-square blocks (e.g., rectangular blocks, etc.).

In addition, the video coder may group a plurality of the set of prediction blocks into a first prediction block group (PBG). In some examples, a PBG may include at least two prediction blocks. For example, a PBG may include one or more vertical prediction blocks, one or more horizontal prediction blocks, or one or more combinations of vertical prediction blocks and horizontal prediction blocks. In another example, a PBG may include a single prediction block. In addition, a CU may include PBGs of varying sizes. For example, a single CU may include a plurality of PBGs with a first PBG formed by grouping one or more prediction blocks (e.g., vertical, horizontal, or both vertical and horizontal blocks), and a second PBG formed by grouping at least two prediction blocks (e.g., vertical, horizontal, or both vertical and horizontal blocks). In some examples, the single CU may additionally include a third PBG formed by grouping at least two prediction blocks (e.g., vertical blocks, horizontal blocks, or both vertical and horizontal blocks), a fourth PBG formed by grouping at least three prediction blocks (e.g., vertical, horizontal, or both), etc.

In addition, one or more subsequent CUs may include the same or a different arrangement of prediction blocks and/or PBGs. For example, a second CU may include the same or at least a similar partitioning to that of one or more preceding CUs. In another example, the second CU may include a different partitioning scheme to that of the one or more preceding CUs. For example, the video coder may partition a first CU using vertical splitting, the second CU using horizontal splitting, a third CU using a combination of horizontal and vertical splitting, a fourth CU using a different type of horizontal splitting (e.g., to form more or less narrow prediction blocks relative to other partitioned prediction blocks), or any other combinations or variations.

While this disclosure describes certain examples in terms of vertical splitting or in some instances, horizontal splitting, it will be understood that the techniques of this disclosure are not so limited, as described. In an additional non-limiting example and for illustration purposes, the video decoder may partition a plurality of CUs using the same partitioning scheme, such as by using vertical splitting to partition at least two CUs. The video coder may additionally group the partitioned prediction blocks, for each partitioned CU, differently or the same. For example, the video coder may perform vertical splitting on a first CU to form a group of at least three PBGs, whereas the video coder may perform a similar vertical splitting on one or more subsequent CUs, but to form at least two PBGs. That is, the quantity of PBGs for each CU may not necessarily be equal from one partitioned CU to a next partitioned CU, even in cases where the video coder partitions each CU using, for example, vertical splitting. It will be understood that, for sake of brevity, not all options may be explicitly delineated, but that other splitting and/or grouping options may be achieved by one or more of the various techniques, or variations of the techniques, described in this disclosure. In addition, a video coder may perform an independent reconstruction of such PBGs, as described above and as further described below.

The video coder may then reconstruct samples of prediction blocks included in the first PBG independently of samples of other prediction blocks included in the first PBG. For example, the video coder may reconstruct the samples as part of a decoding loop. In other instances, video decoder 300 may split a CU to form a set of prediction blocks and group the prediction blocks into PBGs.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
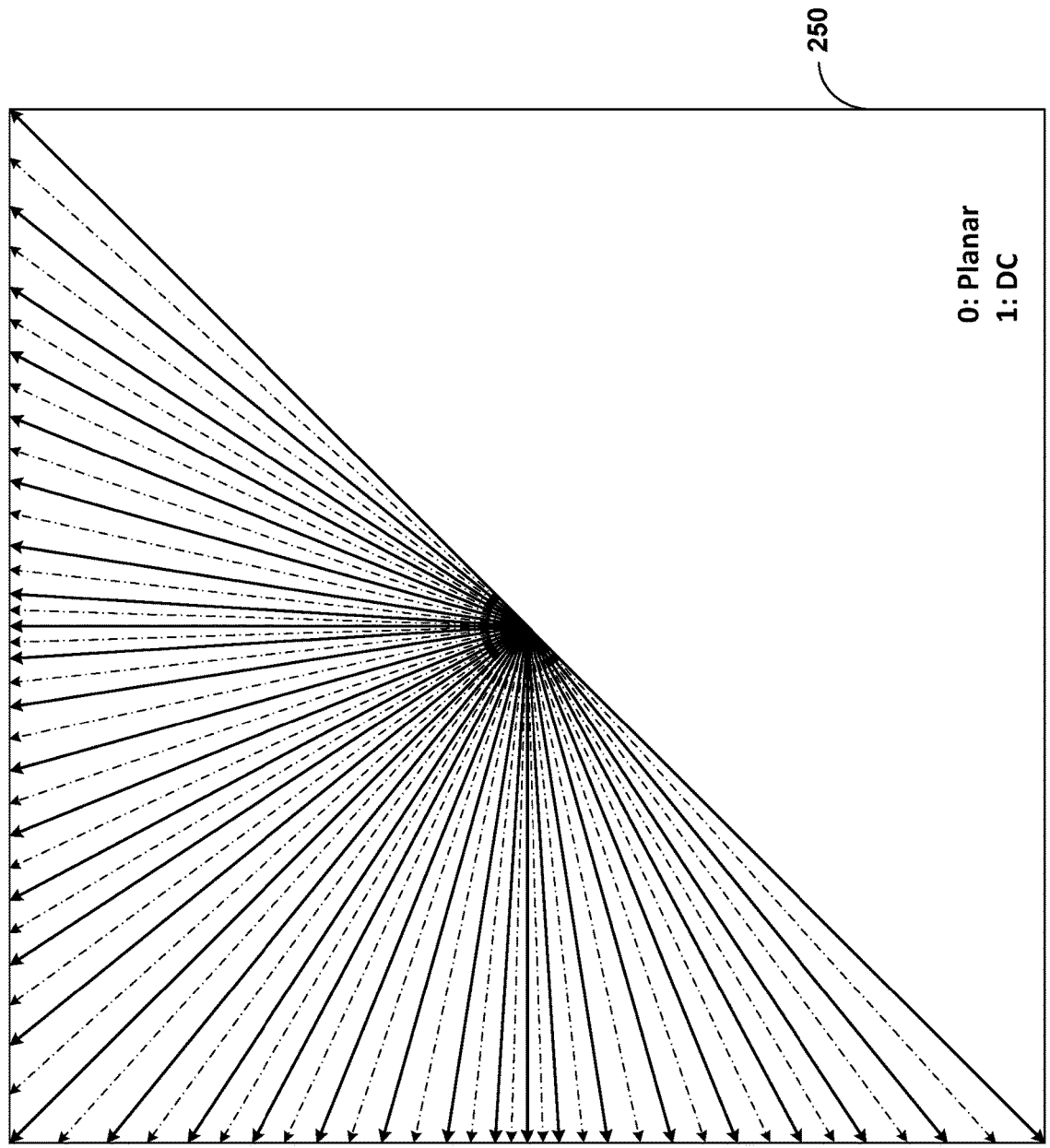
FIG. 2 is a diagram illustrating example intra prediction modes.

FIG. 2 is a diagram illustrating example intra prediction modes. An example of intra prediction is wide-angle intra prediction. In some examples, the intra prediction of a luma block includes 35 modes, including the Planar prediction mode, DC prediction mode and 33 angular (or directional) prediction modes. For example, directional prediction for square blocks, in some instances, may use directions between −135 degrees to 45 degrees of a current block 250, such as in the VVC test model 2 (VTM2) (see "Algorithm description for Versatile Video Coding and Test Model 2 (VTM2)," 11th JVET Meeting, Ljubljana, SI, July 2018, JVET-K1002 by J. Chen, Y. Ye, and S. Kim), as illustrated in FIG. 2. The 35 modes of the intra prediction are indexed as shown in Table 1 below.

TABLE 1

| Specification of intra prediction mode and associated names | |
|---|---|
| Intra prediction mode | Associated name |
| 0 | INTRA_PLANAR |
| 1 | INTRA_DC |
| 2 . . . 34 | INTRA_ANGULAR2 . . . INTRA_ANGULAR34 |

In VTM2, the block structure used for specifying the prediction block for intra prediction is not restricted to be square (width w=height h). For example, rectangular prediction blocks (w>h or w<h) can increase the coding efficiency based on the characteristics of the content.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency. It may be more beneficial to have the range of restrictions relaxed so that closer reference samples (beyond the −135 to 45-degree angle) may be used for prediction. An example of such a case is given in FIG. 3.

Figure 3:
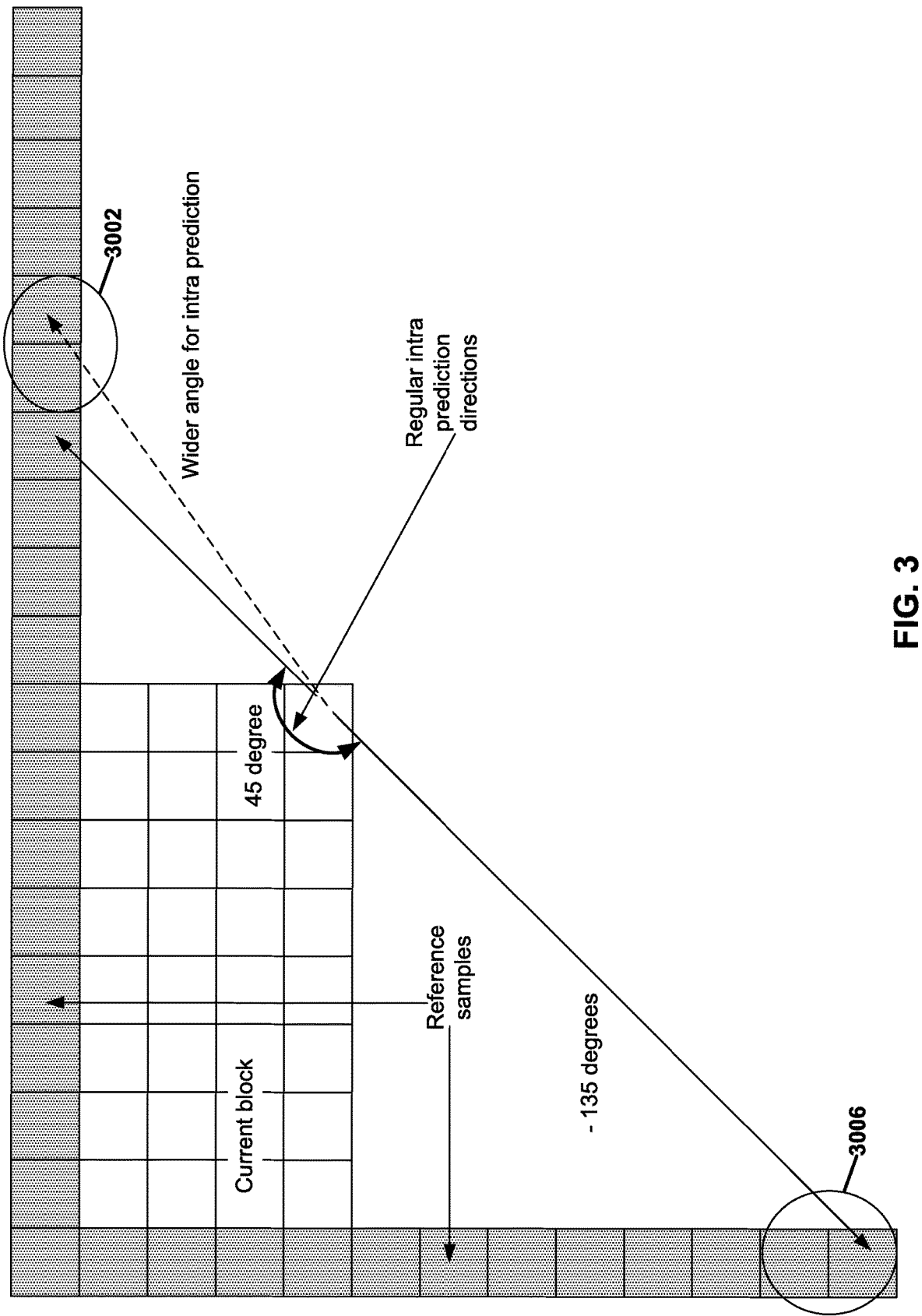
FIG. 3 is a block diagram illustrating an example of an 8×4 rectangular block.

FIG. 3 is a block diagram illustrating an example of an 8×4 rectangular block. In the example of FIG. 3, "closer" reference samples (indicated by circle 3002) are not used, but "farther" reference samples (indicated by circle 3006) may be used, due to restriction of intra prediction direction to be in the range of −135 degrees to 45 degrees. That is, in the example of FIG. 3, some reference samples within −135 degrees but farther than those indicated by circle 3002 may be used, while some reference samples are not used although they are closer than other samples, e.g., closer than the samples indicated by circle 3006.

Figure 4A:
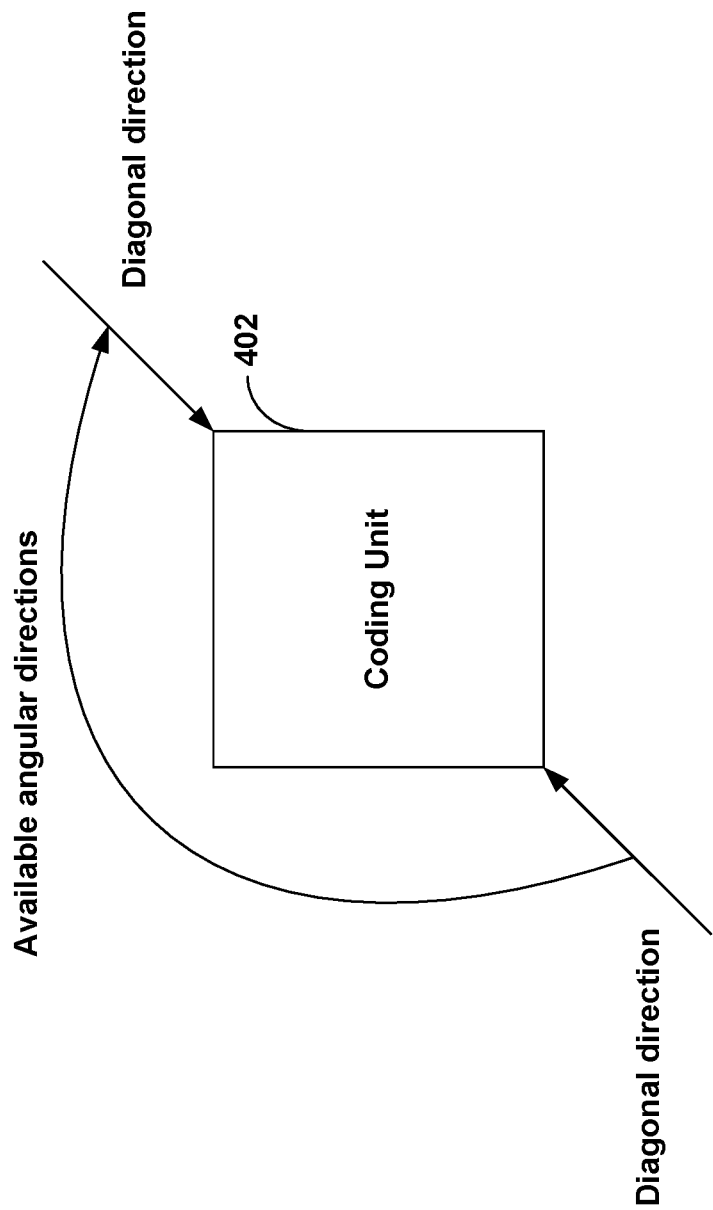
FIGS. 4A-4C are block diagrams providing illustrations of mode mapping process(es) for modes outside the diagonal direction range.
Figure 4B:
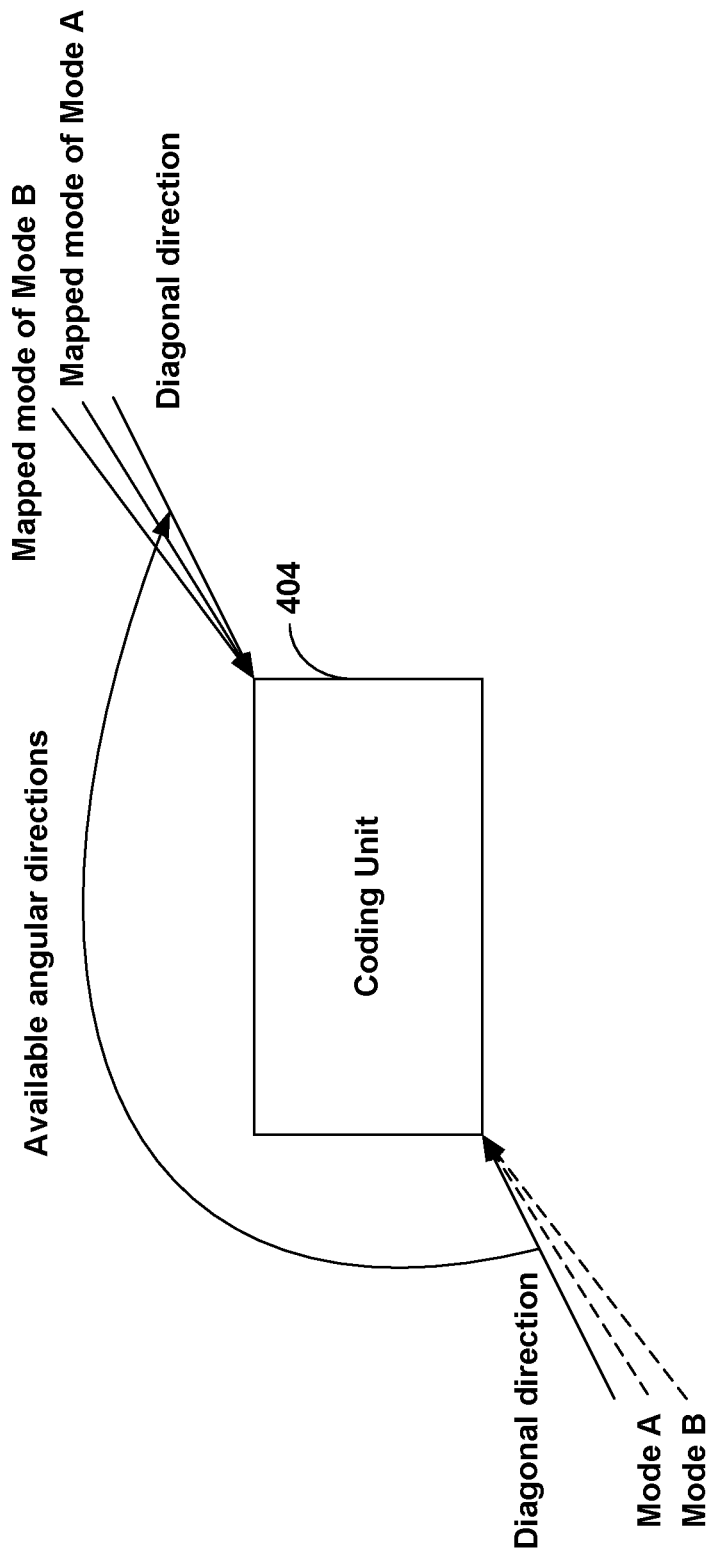
Figure 4C:
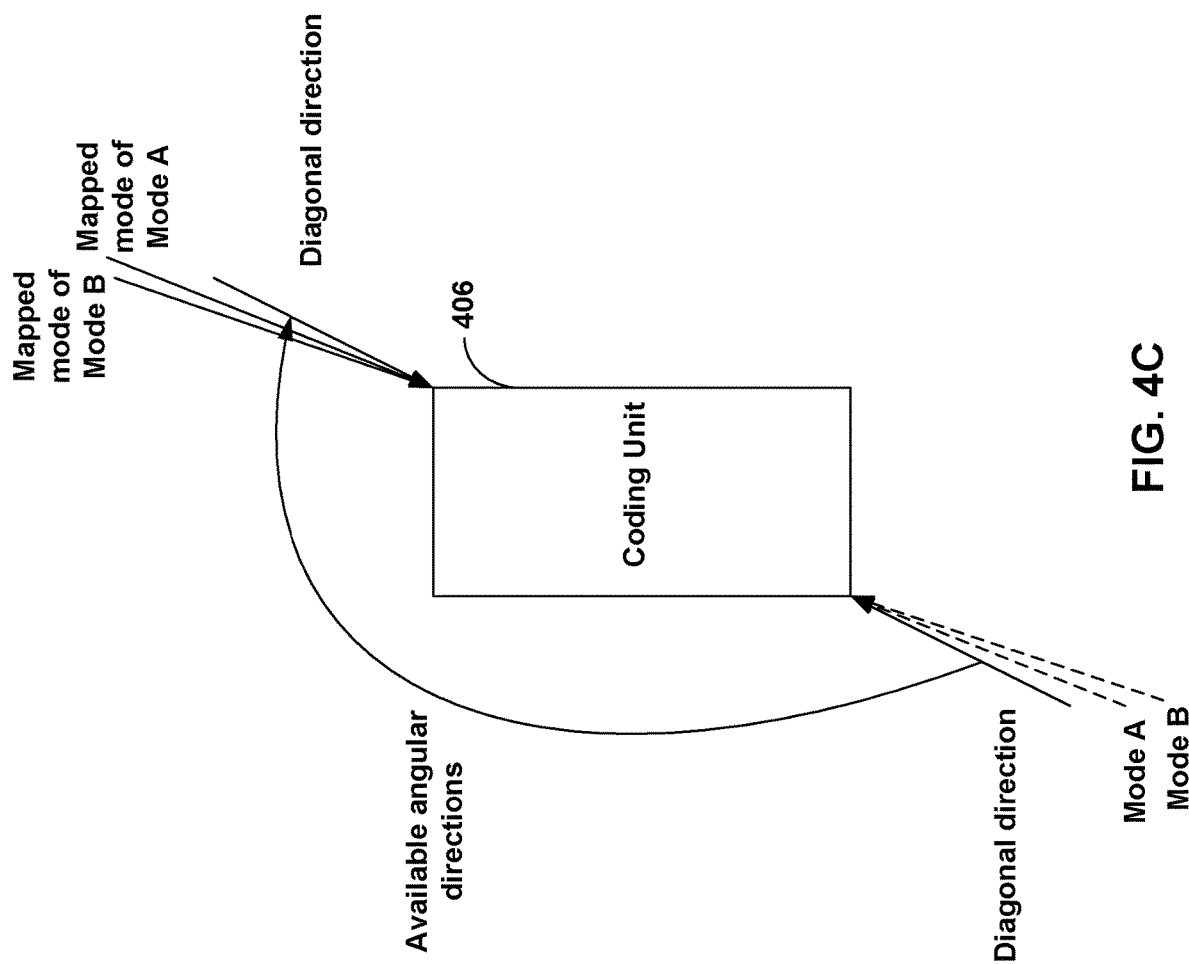

FIGS. 4A-4C are block diagrams providing illustrations of mode mapping process(es) for modes outside the diagonal direction range. In the example of FIG. 4A, a square block CU 402 does not require angular mode remapping. FIG. 4B illustrates angular mode remapping for a horizontal non-square block CU 404. FIG. 4C illustrates angular mode remapping for a vertical non-square block CU 406.

Figure 5:
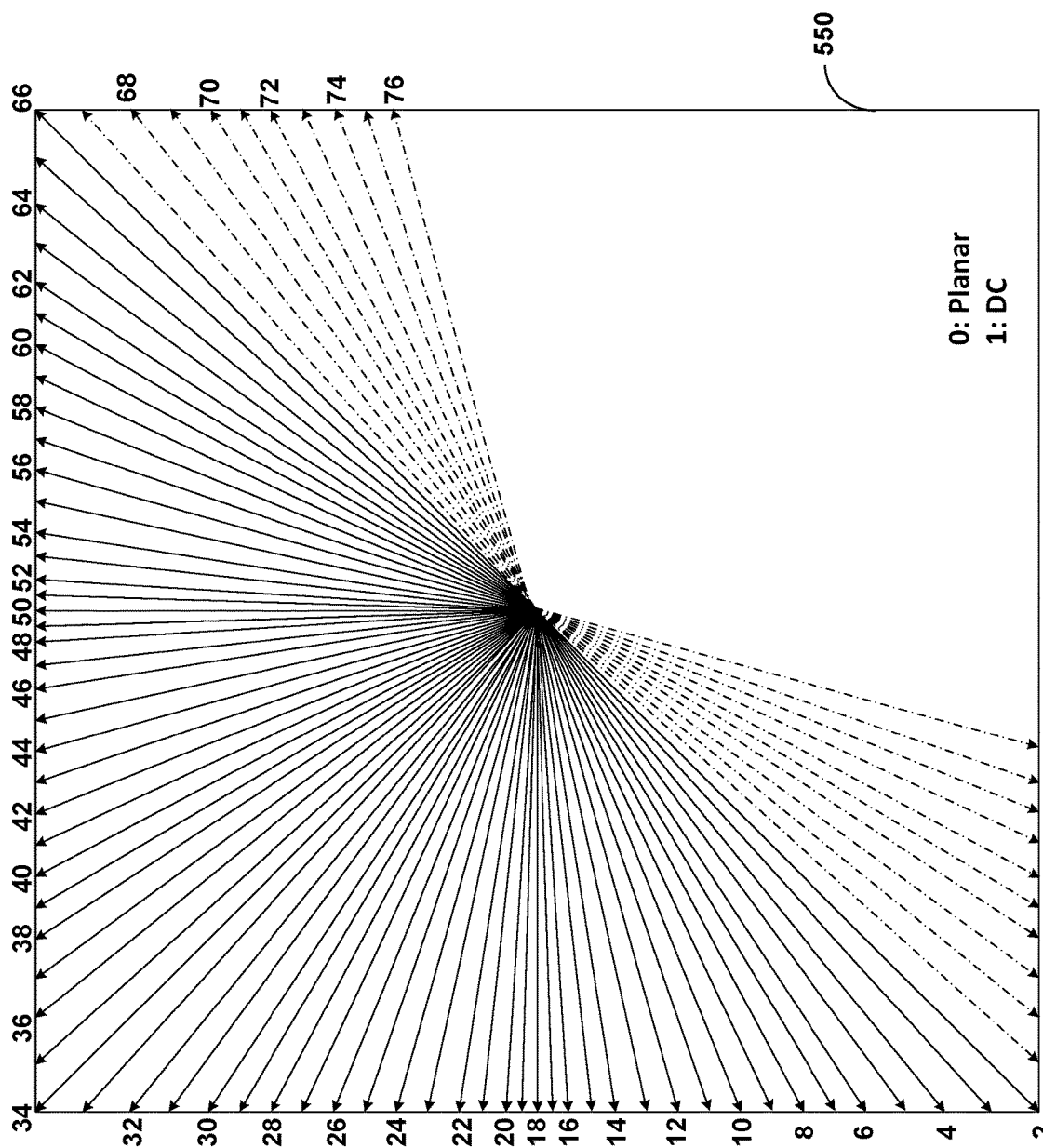
FIG. 5 is a block diagram illustrating wide-angles that are adopted in VTM2.

FIG. 5 is a block diagram illustrating wide-angle intra-prediction adopted in VTM2. In some examples, wide-angle intra-prediction includes angular intra prediction for square and non-square blocks, such as block 550.

During the 12th JVET meeting, a modification of wide-angle intra prediction was adopted into VVC test model 3 (VTM3), details of which are available from (i) "CE3-related: Unification of angular intra prediction for square and non-square blocks," 12th JVET Meeting, Macau SAR, CN, October 2018, JVET-L0279 by L. Zhao, X. Zhao, S. Liu, and X. Li; (ii) "Algorithm description for Versatile Video Coding and Test Model 3 (VTM3)," 12th JVET Meeting, Macau SAR, CN, October 2018, JVET-L1002 by J. Chen, Y. Ye, and S. Kim; and (iii) "Versatile Video Coding (Draft 3)," 12th JVET Meeting, Macau SAR, CN, October 2018, JVET-L1001 by B. Bross, J. Chen, and S. Liu.

This adoption includes two modifications to unify the angular intra prediction for square and non-square blocks. First, angular prediction directions may be modified to cover diagonal directions of all block shapes. Second, angular directions may be kept within the range between the bottom-left diagonal direction and the top-right diagonal direction for all block aspect ratios (square and non-square) as illustrated in FIGS. 4A-4C and described above. In addition, the number of reference samples in the top reference row and left reference column are restricted to 2*width+1 and 2*height+1 for all block shapes. In the example of FIG. 5, wide angles (−1 to −10, and 67 to 76) are depicted in addition to the 65 angular modes.

Figure 6:
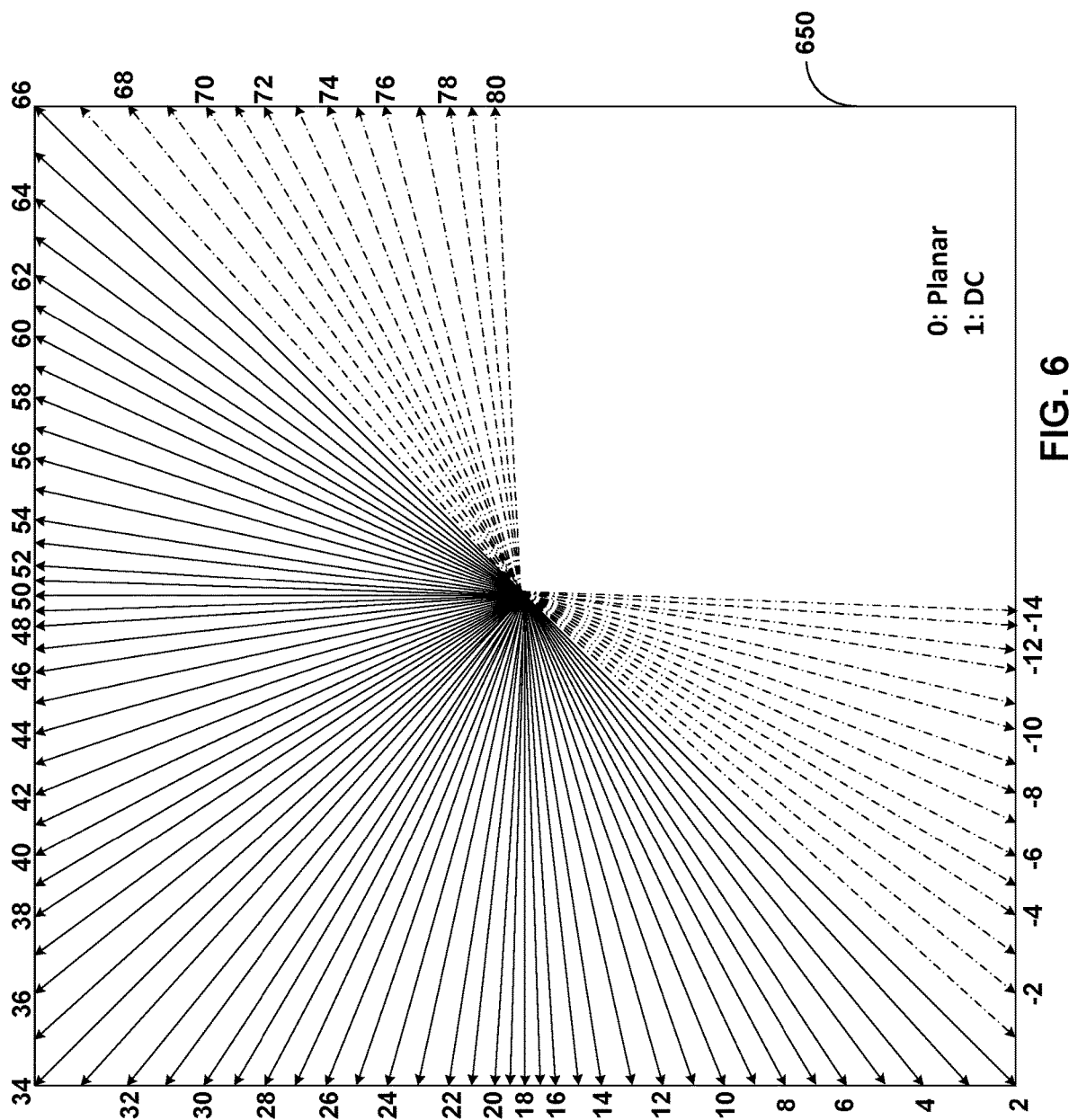
FIG. 6 is a block diagram illustrating wider-angles that are adopted in VTM3.

FIG. 6 is a block diagram illustrating wider angles for prediction of blocks 650 that are adopted in VTM3. Although VTM3 defines 95 modes for any block size, only 67 modes may be allowed. The exact modes that are allowed depend on the ratio of block width to block height. This is done by restricting the mode range for certain blocks sizes. FIG. 6 provides an illustration of wide angles (−1 to −14, and 67 to 80) in VTM3 beyond modes 2 and 66 for a total of 93 angular modes.

FIG. 7 is an example mapping table that provides an example mapping between predModeIntra and the angle parameter intraPredAngle in VTM3, further details of which are available from "Versatile Video Coding (Draft 3)," 12th JVET Meeting, Macau SAR, CN, October 2018, JVET-L1001 by B. Bross, J. Chen, and S. Liu. In the following, angular modes with a positive intraPredAngle value are referred to as positive angular modes (mode index <18 or >50), while angular modes with a negative intraPredAngle value are referred to as negative angular modes (mode index >18 and <50).

The inverse angle parameter invAngle is derived based on intraPredAngle as follows in Eq. (1):

$$invAngle = \text{Round}\left(\frac{256*32}{intraPredAngle}\right) \quad (1)$$

Note that intraPredAngle values that are multiples of 32 (i.e. values of 0, 32, 64, 128, 256, 512 in this example) correspond with prediction from non-fractional reference array samples, as is the case in the VTM3 specification. Table 2 below illustrates diagonal modes corresponding with various block aspect ratios.

TABLE 2

Diagonal modes corresponding with various block aspect ratios.

| Block aspect ratio (W/H) | Diagonal modes |
| --- | --- |
| 1 (square) | 2, 34, 66 |
| 2 | 8, 28, 72 |
| 4 | 12, 24, 76 |
| 8 | 14, 22, 78 |
| 16 | 16, 20, 80 |
| ½ | −6, 40, 60 |
| ¼ | −10, 44, 56 |
| ⅛ | −12, 46, 54 |
| 1/16 | −14, 48, 52 |

Intra sub-partition coding is described in the following portions of this disclosure. Intra sub-partition coding (ISP) (S. De Luxán Hernández, H. Schwarz, D. Marpe, T. Wiegand (HHI) "CE3: Line-based intra coding mode", JVET-L0076) is a method by which a coding block (e.g., a coding unit) is split or partitioned into multiple subblocks. For example, a coding unit may be split or partitioned into two subblocks, four subblocks, etc. In some instances, a subblock may be referred to as a prediction block. In some examples, each subblock within a coding block is reconstructed in decoding order before the reconstruction of the subsequent subblock in decoding order. In the fourth working draft of VVC (hereinafter "VVC WD4" and available at phenix.it-sudparis.eu/jvet/doc_end_user/documents/13_Marrakech/wg11/JVET-M1001-v2.zip), ISP may only be applied to luma coding blocks. In such examples, the reference samples for these ISP-coded blocks are restricted to be from the reference line that is closest to the coding block (refer MRLIdx=0 as discussed below with reference to multiple reference line prediction).

Figure 8:
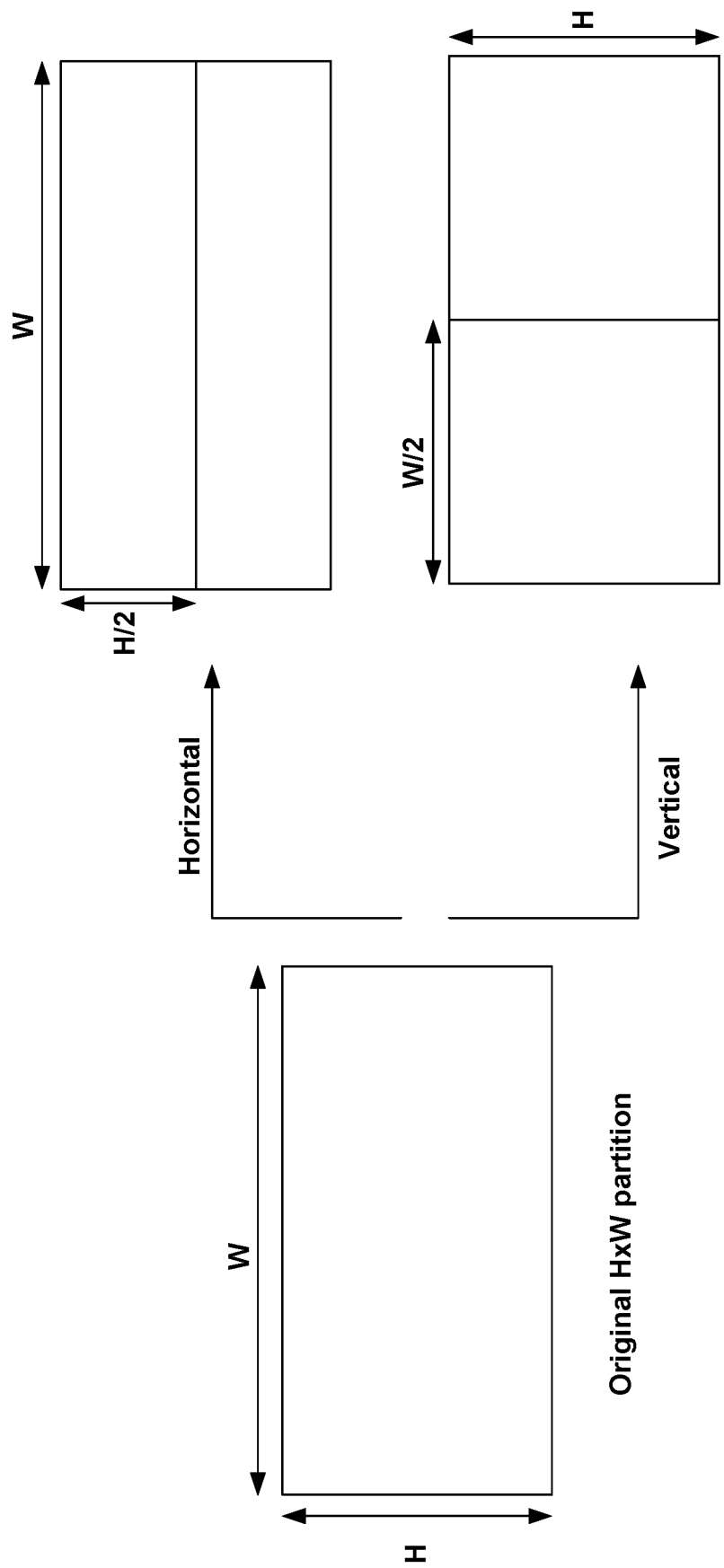
FIG. 8 is a block diagram illustrating example divisions of blocks for intra sub-partition coding.
Figure 9:
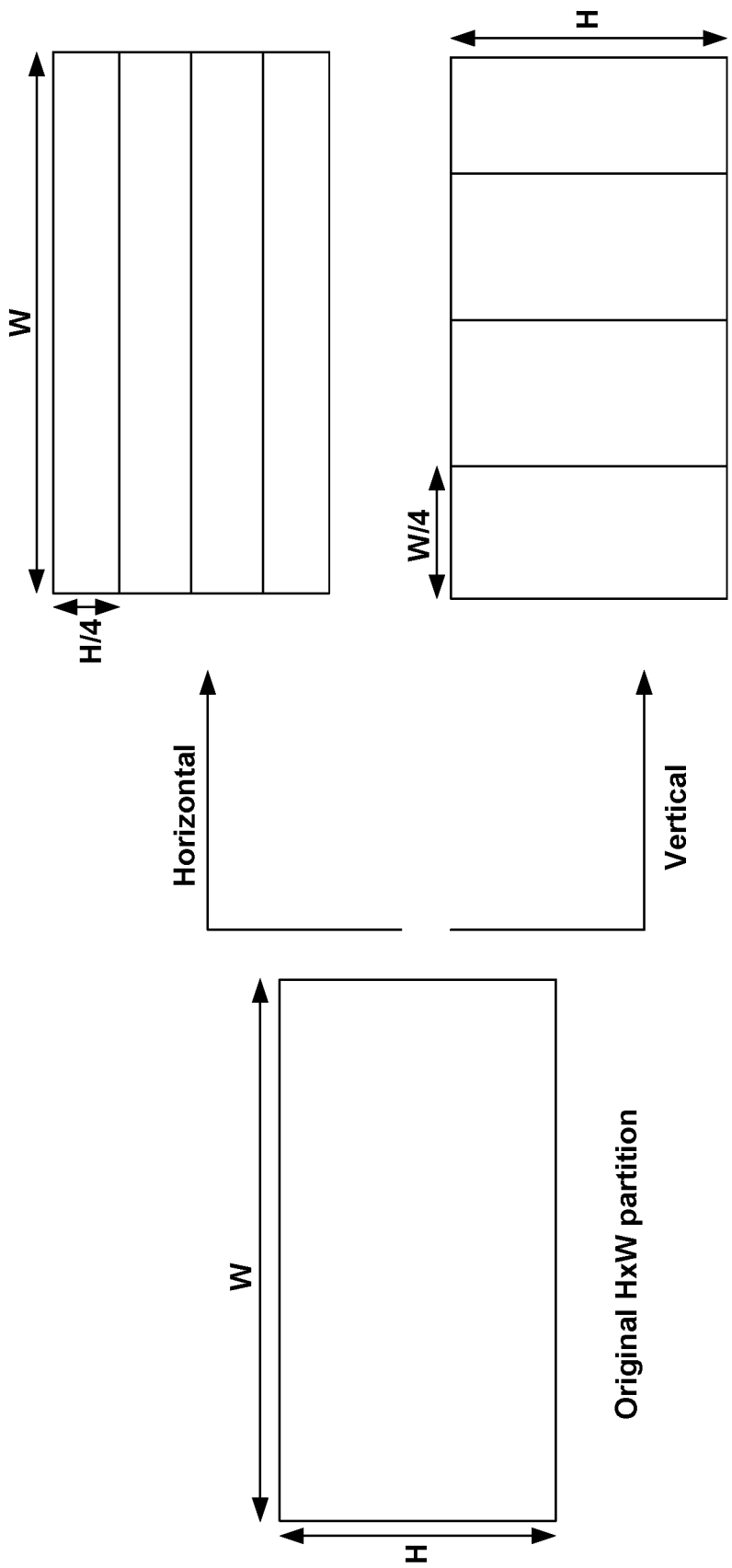
FIG. 9 is a block diagram illustrating example divisions of blocks for intra sub-partition coding.

FIGS. 8 and 9 are block diagrams illustrating example divisions of blocks for ISP coding. FIG. 8 illustrates an example of division of 4×8 and 8×4 blocks. FIG. 9 illustrates an example of division of all blocks except 4×8, 8×4, and 4×4 blocks.

One bit is used to signal whether a coding block is split into intra sub-partitions, and a second bit is used to indicate the split type. Example split types include horizontal splitting, vertical splitting, vertical and horizontal splitting, etc. Based on the intra mode and the split type used, two different classes of processing orders may be used, which are referred to as normal order and reverse processing order. In the normal order, the first sub-partition to be processed is the one containing the top-left sample of the CU and then continuing downwards (horizontal split) or rightwards (vertical split). On the other hand, the reverse processing order either starts with the sub-partition containing the bottom-left sample of the CU and continues upwards (horizontal split) or starts with the sub-partition containing the top-right sample of the CU and continues leftwards (vertical split).

In some examples, a variation of ISP may use only the normal processing order, such as in VVC WD4. It is to be noted that the terms "subblock" and "sub-partitions" may be used interchangeably herein. In any case, both terms refer to the blocks obtained by partitioning a coding block using ISP.

Some syntax (e.g., Tables 3 and 4) and semantics associated with ISP in VVC WD4 are shown below, with italics to indicate relevant syntax:

TABLE 3

Syntax table of coding unit

| | Descriptor |
|---|---|
| coding_unit( x0, y0, cbWidth, cbHeight, treeType ) { | |
| ... | |
|    } else { | |
|       if( treeType = = SINGLE_TREE \| \| treeType = = DUAL_TREE_LUMA ) { | |
|          if( ( y0 % CtbSizeY ) > 0 ) | |
|             intra_luma_ref_idx[ x0 ][ y0 ] | ae(v) |
|          *if (intra_luma_ref_idx[ x0 ][ y0 ] = = 0 &&* | |
|             *( cbWidth < = MaxTbSizeY \| \| cbHeight < = MaxTbSizeY ) &&* | |
|             *( cbWidth * cbHeight > MinTbSizeY * MinTbSizeY ))* | |
|             intra_subpartitions_mode_flag[ x0 ][ y0 ] | ae(v) |
|          if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|          if( intra_luma_ref_idx[ x0 ][ y0 ] = = 0 && | |
|             intra_subpartitions_mode_flag[ x0 ][ y0 ] = = 0 ) | |
|             intra_luma_mpm_flag[ x0 ][ y0 ] | ae(v) |
|          if( intra_luma_mpm_flag[ x0 ][ y0 ] ) | |
|             intra_luma_mpm_idx[ x0 ][ y0 ] | ae(v) |
| ... | |

TABLE 4

Syntax table of transform tree

| | Descriptor |
|---|---|
| transform_tree( x0, y0, tbWidth, tbHeight, treeType) { | |
|   *InferTuCbfLuma = 1* | |
|   *if( IntraSubPartSplitType = = NO_ISP_SPLIT)* { | |
|       if( tbWidth > MaxTbSizeY \| \| tbHeight > MaxTbSizeY ) { | |
|          trafoWidth = ( tbWidth > MaxTbSizeY ) ? (tbWidth / 2) : tbWidth | |
|          trafoHeight = ( tbHeight > MaxTbSizeY ) ? (tbHeight / 2) : tbHeight | |
|          transform_tree( x0, y0, trafoWidth, trafoHeight ) | |
|          if( tbWidth > MaxTbSizeY ) | |
|             transform_tree( x0 + trafoWidth, y0, trafoWidth, trafoHeight, treeType ) | |
|          if( tbHeight > MaxTbSizeY ) | |
|             transform_tree( x0, y0 + trafoHeight, trafoWidth, trafoHeight, treeType ) | |
|          if( tbWidth > MaxTbSizeY && tbHeight > MaxTbSizeY ) | |
|      transform_tree( x0 + trafoWidth, y0 + trafoHeight, trafoWidth, trafoHeight, treeType ) | |
|       } else { | |
|          transform_unit( x0, y0, tbWidth, tbHeight, treeType, 0 ) | |
|       } | |
|   *} else if( IntraSubPartitionsSplitType = = ISP_HOR_SPLIT)* { | |
|      *trafoHeight = tbHeight / NumIntraSubPartitions* | |
|      *for( partIdx = 0; partIdx < NumIntraSubPartitions; partIdx+ + )* | |
|     transform_unit( x0, y0 + trafoHeight * partIdx, tbWidth, trafoHeight, treeType, partIdx ) | |
|   *} else if( IntraSubPartitionsSplitType = = ISP_VER_SPLIT)* { | |
|      *trafoWidth = tbWidth / NumIntraSubPartitions* | |
|      *for( partIdx = 0; partIdx < NumIntraSubPartitions; partIdx+ + )* | |
|     transform_unit( x0 + trafoWidth * partIdx, y0, trafoWidth, tbHeight, treeType, partIdx) | |
|     } | |
| } | |

Semantics of Coding Unit intra_subpartitions_mode_flag[x0][y0] equal to 1 specifies that the current intra coding unit is partitioned into NumIntraSubPartitions[x0][y0] rectangular transform block sub-partitions. intra_subpartitions_mode_flag[x0][y0] equal to 0 specifies that the current intra coding unit is not partitioned into rectangular transform block sub-partitions.

When intra_subpartitions_mode_flag[x0][y0] is not present, the value of intra_subpartitions_mode_flag is inferred to be equal to 0.

In some examples, an intra sub-partitions split flag may be used to indicate a split type or the split types. For example, a intra_subpartitions_split_flag[x0][y0] may specify a split types or a number of various split types. In some examples, the intra sub-partitions split flag may indicate whether the intra sub-partitions split type is horizontal, vertical, rectangular, a mix of vertical and horizontal, or any other split type. When intra_subpartitions_mode_flag[x0][y0] is not present, the video coder may infer the flag to be equal to 0.

The variable IntraSubPartitionsSplitType specifies the type of split used for the current luma coding block as illustrated in Table 5 below. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 5

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block sub-partitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2: (1) cbWidth is equal to 4 and cbHeight is equal to 8, or (2) cbWidth is equal to 8 and cbHeight is equal to 4. Otherwise, NumIntraSubPartitions is set equal to 4.

Multiple reference line prediction will be described in the following portions of this disclosure. The samples in the neighbourhood of a coding block are used for intra prediction of the block. Typically, the reconstructed reference sample lines that are closest to the left and the top boundaries of the coding block are used as the reference samples for intra prediction. In some examples, such as in VVC WD4, a video coder may use other samples as references samples, such as samples in the neighbourhood of the coding block or CU.

Figure 10:
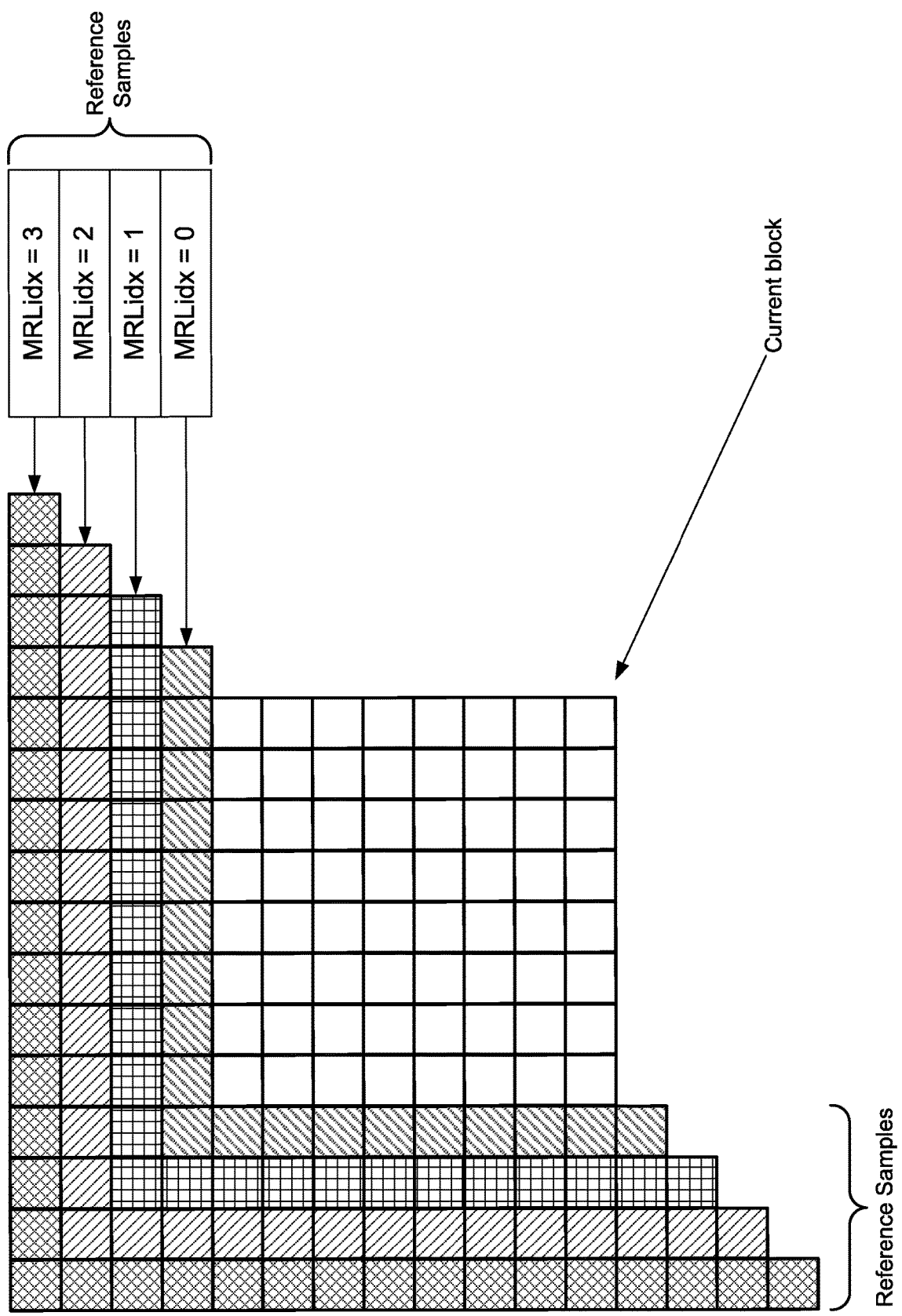
FIG. 10 is a block diagram illustrating multiple reference line prediction.

FIG. 10 is a block diagram illustrating the reference sample lines that may be used for intra prediction. For each coding block, an index is signalled that indicates the reference line that is used.

In some examples, such as in VVC WD4, a video coder may only use reference lines with MRLIdx equal to 0, 1 or 3. A video coder may code the index to the reference line used for coding the block (e.g., values 0, 1 and 2 indicating lines with MRLIdx 0, 1 and 3, respectively) with truncated unary codeword. Planar and DC modes are not used for the reference line used has MRLIdx>0.

In some examples, the intra sub-partition (ISP) coding of blocks (e.g., coding units (CUs)) may result in subblocks (e.g., prediction blocks) that have very small size in one or more dimensions. For example, when a video coder codes a coding block of size 4×N (W×H) using ISP coding, and vertical splitting is used, the resultant subblocks have size 1×N when N is greater than 8. In implementations that rely on row-wise storage of samples, increasingly narrow subblocks may result in memory access of samples that are more than the number of samples in the subblock. When a block is of size M×N, accessing the M samples in each row from memory may often involve an overhead, such as accessing more than M samples due to a limitation on the minimum number of samples per access.

Due to the narrow shape of 1×N and 2×N blocks, this problem may be exacerbated as the number of rows is larger for narrow blocks. For example, a 4×4 block may only have four rows. A 1×16 subblock, although having the same number of samples as the 4×4 block, has 16 rows to be accessed. The resultant overhead may have issues in delay critical cases, particularly in the worst case where there are several small coding blocks in high resolution sequences. As the reconstruction of a subblock in the coding block may be dependent on the reconstruction of other subblocks in the coding block that precede in decoding order, these subblocks are likely to increase the delay for decoding the block, which may be undesirable.

Some solutions for addressing the problem have been proposed. However, each of the proposed solutions involves drawbacks that may result in coding inefficiencies. One proposed solution is to disable the vertical splitting of 4×N and 8×N blocks that result in blocks of size 1×N and 2×N, respectively. However, this proposed solution may reduce the efficiency of ISP. Another proposed solution (i.e., in S. De Luxán Hernández, V. George, J. Ma, T. Nguyen, H. Schwarz, D. Marpe, T. Wiegand (HHI), "CE3: Intra Sub-Partitions Coding Mode," JVET-M0102) is to restrict the prediction of 1×N subblocks to VER prediction mode such that they are not dependent on the reconstruction of other subblocks in the coding block. However, this proposed solution also results in limiting the intra modes allowed for the coding block, which results in coding inefficiency.

This disclosure proposes techniques to improve the design of sub-partition coding of CUs. One or more of the techniques disclosed here may be implemented separately or implemented together in any combination.

According to a first proposed technique, a video coder (e.g., video encoder 200 and/or video decoder 300) may perform generalized prediction of subblocks (e.g., prediction blocks). As one example, the video coder may code an indication (e.g., a syntax element) to perform generalized prediction for a coding block. In some examples, the indication to perform generalized prediction may involve an indication that the coding block is coded with ISP. In some examples, the indication to perform generalized prediction may apply to only blocks with certain properties, e.g., when the block width is within a threshold range, or when the block height is within a threshold range, or when the number of samples in the block is within a threshold range, or when the sum of the block width and block height is within a threshold range, or when the minimum or maximum of the block width and block height is within a threshold range. In some examples, for a block, a subset of intra modes may be defined from the set of allowed intra modes for the block. In such examples, generalized prediction may only apply to the block when the block is coded with an intra mode that belongs to the subset. In some examples, the indication may be inferred by the block properties/characteristics, intra mode and properties of neighbouring blocks, or no explicit signalling may be used. For instance, when the block width is less than a particular threshold, generalized prediction may be applied.

As another example, based on the indication of performing generalized prediction, the video coder may split a coding unit into one or more prediction blocks.

As another example, the video coder may define one or more prediction block groups (PBGs). A PBG may include one or more prediction blocks. The prediction of any sample in a PBG may not be directly dependent on the predicted value of any other sample in the PBG. For example, a video coder may reconstruct samples of prediction blocks included in a first PBG independently of samples of other prediction blocks included in the same PBG. In this way, the prediction of samples in the first PBG is not dependent on the predicted value of other samples in the first PBG.

In some examples, each PBG contains exactly one prediction block. In some examples, each PBG may contain $n_{PB}$ prediction blocks (e.g., a prediction block quantity). In such examples, the video coder may determine the value of $n_{PB}$ based on the width and height of the coding unit. In another example, the video coder may determine the value of $n_{PB}$ based on the number of samples of the coding unit or on the number of samples and the width and height of the coding unit. In some examples, the video coder may also use the split type (e.g., horizontal, vertical, rectangular, a mix of horizontal and vertical, etc.) and/or the intra mode (e.g., angular, etc.) to determine the value of $n_{PB}$ for a coding unit or coding block. In some examples, a video coder may specify prediction blocks that are not rectangular in shape.

In some examples, the restriction that "the prediction of any sample in a PBG may not be dependent on the predicted value of any other sample in the PBG" may be relaxed. For example, when certain filtering operations are applied on predicted blocks that may result in a dependence between the predicted value of samples within a PBG, the restriction of prediction dependence of samples within a PBG may still be considered valid as long as the regular intra prediction (without the post-prediction filtering operations) do not result in a dependence. For instance, the restriction may not apply to dependence due to position dependent intra prediction combination (PDPC), boundary filtering or other similar operations. In some examples, each prediction block in a coding block may be contained in one and only one PBG. In some examples, this restriction may be stricter. For example, it may be restricted that each prediction block in a coding block must be contained in one PBG, and only one PBG.

As another example, the video coder may specify a decoding order of the PBGs; the decoding order may be defined such that samples in a PBG P1 do not depend on the samples in a PBG P2 when P1 precedes P2 in decoding order.

As another example, for each PBG, the video coder may specify a set of available reference samples (described below).

As another example, the video coder may obtain a predicted value for a sample in the PBG based on the available reference samples for the PBG and the intra mode used for prediction.

According to a second proposed technique, a video coder may perform generalized planar prediction. As one example, the video coder may define a set of prediction blocks for a coding block In some examples, the video coder may code one or more of the prediction blocks with a Planar mode. The video coder may perform the determination to split a coding block into planar prediction blocks by one or more of the following:

1. An indication in the bitstream (e.g., a flag) that the block is to be split into planar prediction blocks. In some examples, the coding block may be indicated to be coded by the Planar mode. In another example, the indication may be that the coding block is coded using ISP.

2. Planar prediction blocks may be indicated by a separate mode value $M_{PPB}$. When a block is indicated to be coded with $M_{PPB}$, the block is split into planar prediction blocks.

3. The determination may be inferred based on certain block characteristics and other syntax elements in the bitstream. For example, a block with a certain maximum number of samples and coded with ISP may be split into planar prediction blocks.

In some examples, the video coder may determine the number of planar prediction blocks, $N_{PPB}$, and the splitting decisions, by one or more of the following: $N_{PPB}$ may be signalled in the bitstream (e.g., for all blocks or for blocks with certain characteristics) or derived based on the block characteristics and other syntax elements in the bitstream. For example, the $N_{PPB}$ may be set equal to the number of intra sub-partition blocks for a coding block. In other examples, the value of $N_{PPB}$ may be set equal to 4. The split direction or method may be determined by the block characteristics or derived from syntax elements in the bitstream.

In some examples, the block may be split horizontally into $N_{PPB}$ planar prediction blocks. The decision to split horizontally may, for example, be determined by whether a horizontal split direction is indicated.

Figure 11:
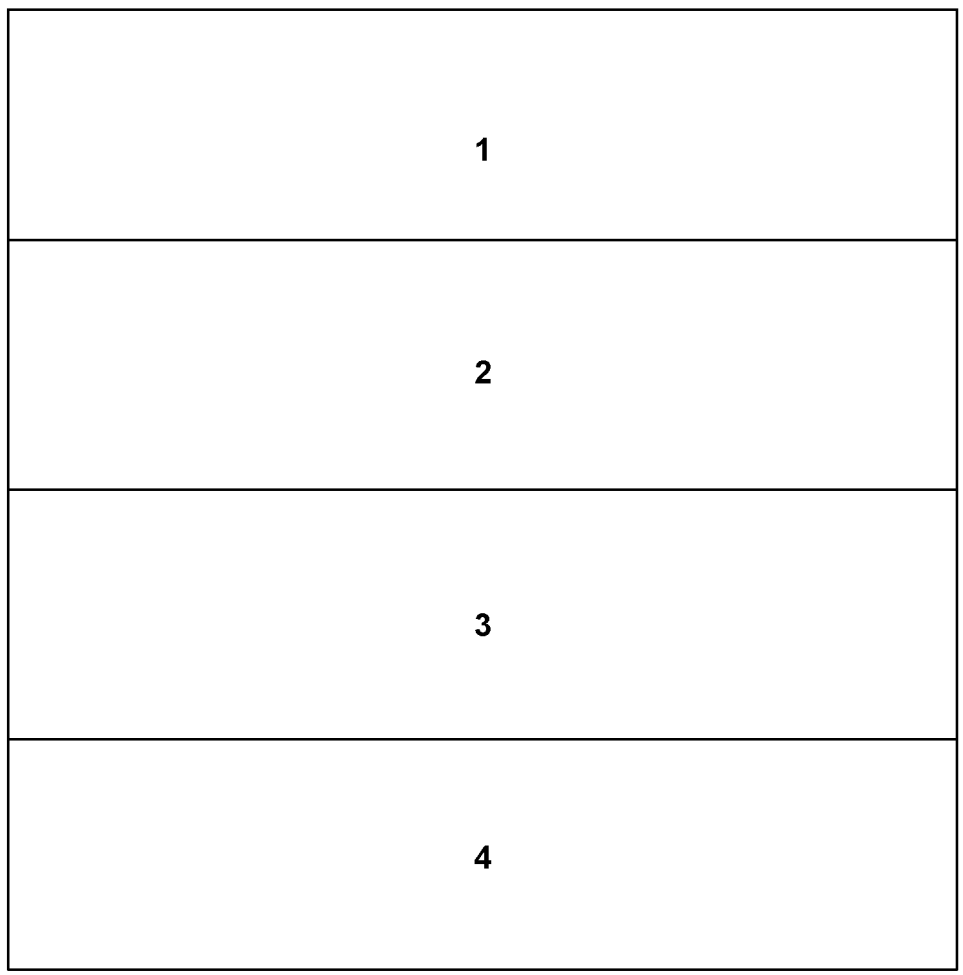
FIG. 11 is a conceptual diagram illustrating an example of how a coding block may be split into four horizontal planar prediction blocks.

FIG. 11 is a conceptual diagram illustrating an example of how a coding block may be split into four horizontal planar prediction blocks.

In some examples, the video coder may split the block vertically into $N_{PPB}$ planar prediction blocks. The video coder may determine whether to split vertically based on whether a vertical split direction is indicated, for example.

Figure 12:
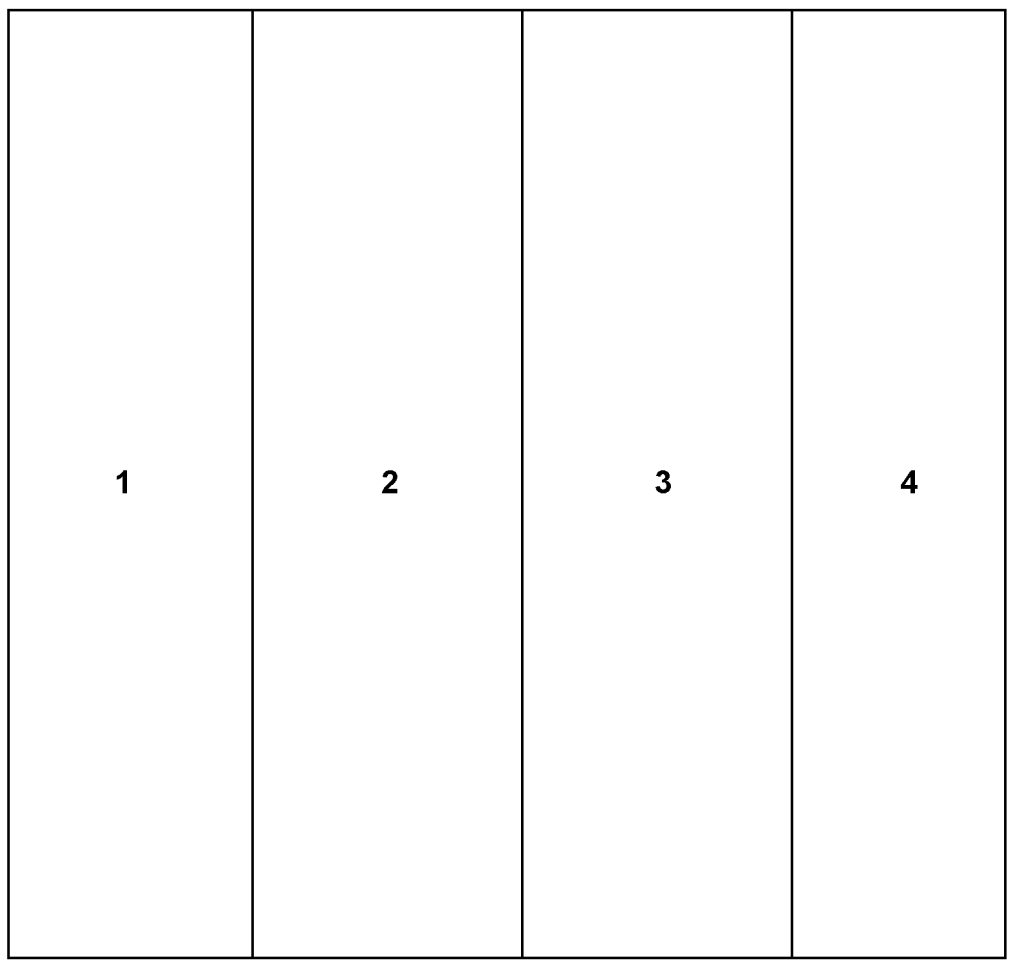
FIG. 12 is a conceptual diagram illustrating an example of how a coding block may be split into four vertical planar prediction blocks.

FIG. 12 is a conceptual diagram illustrating an example of how a coding block may be split into four vertical planar prediction blocks.

In some examples, the video coder may split the block horizontally and vertically resulting in a total of $N_{PPB}$ planar prediction blocks. The video coder may determine whether to split horizontally and vertically based on one or more characteristics of the block (e.g., characteristics of a CU). In some examples, the video coder may determine whether to split horizontally and vertically when no split direction is indicated.

Figure 13:
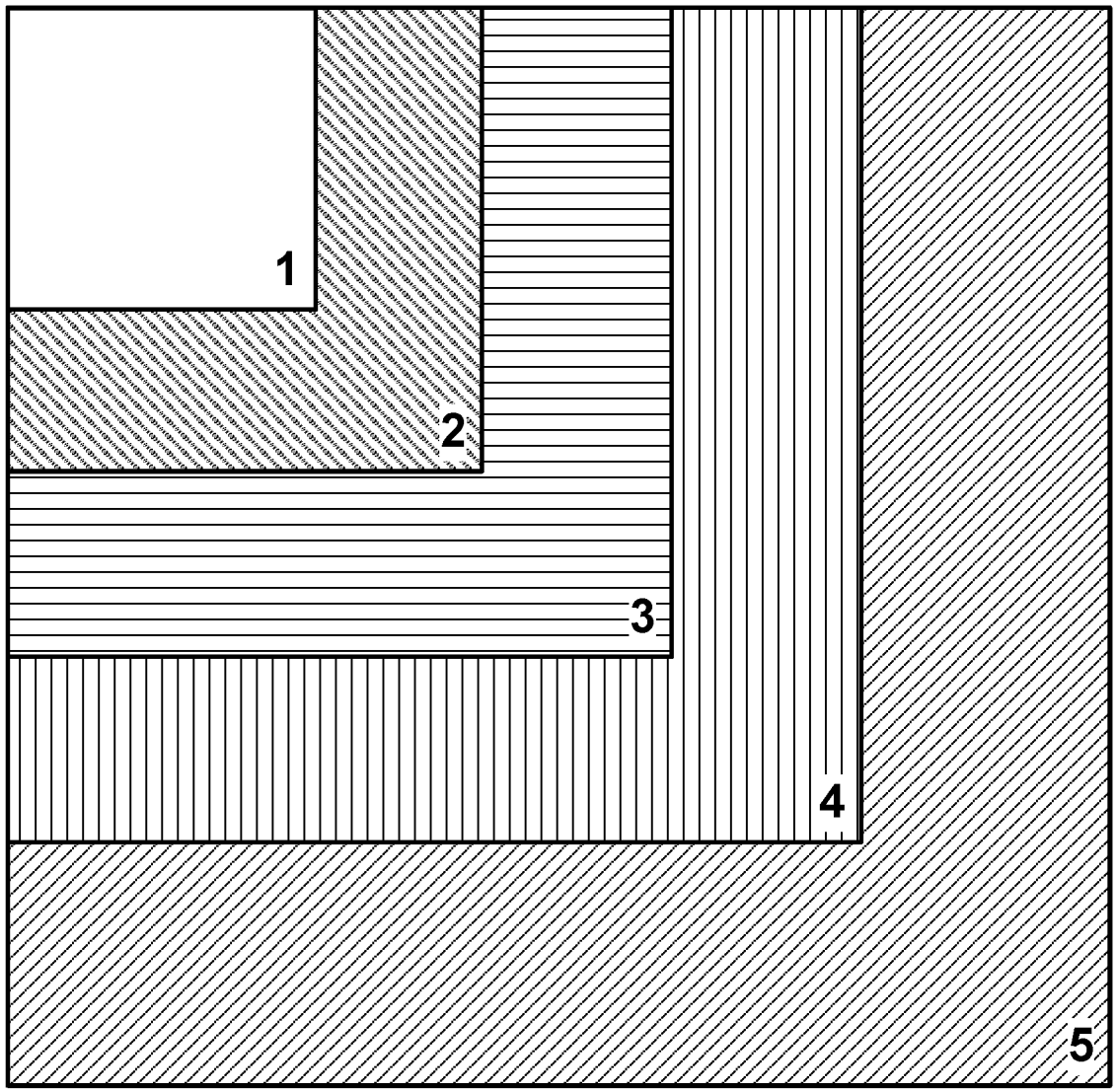
FIG. 13 is a conceptual diagram illustrating an example of such a planar prediction block structure.

In some examples, the block may be split into $N_{PPB}$ rectangular regions, that share the same top-left sample as the coding block and each rectangular region successively containing the one before it. Starting with the smallest block which is defined as the first planar prediction block, samples that belong to the next rectangular region but do not belong to the previous rectangular region are said to constitute the succeeding planar prediction block. FIG. 13 is a conceptual diagram illustrating an example of such a planar prediction block structure.

In some examples, the video coder may also predict a planar prediction block by a method that is similar to the planar prediction mode.

In some examples, the video coder may define a coding order for the prediction blocks. For example, the coding order may be defined by considering the following (a. through d.):

a. Assign a representative sample for each prediction block; e.g., top-left sample of a prediction block. In some cases (non-rectangular blocks), the top-left sample may not be defined, and the representative sample may be specified as the left-most sample that is in the top-most row of samples of the prediction block. It must be understood that the coding order may be also specified with other definitions of representative samples.

b. Define a scan order of representative samples (e.g., raster scan, zigzag scan).

c. A prediction block that has a representative sample earlier in the scan order is coded earlier than a prediction block that has a representative sample later in the scan order.

d. Similar definition of coding order may also be specified for prediction block groups.

In some examples, the video coder may specify a planar prediction block group (Planar PBG), including one or more planar prediction blocks, similar to the idea of PBG discussed above.

The boundaries between the planar prediction blocks may be smoothed by applying filtering across the prediction block boundaries within the coding block. One example of such filtering is lowpass filtering. A second example is the processing performed in PDPC mode. A third example is a deblocking filter process. These processes may be applied as a second processing step after prediction or as a post-processing step.

It is to be understood that the above examples of planar prediction blocks are only some examples for illustrating the concept. The samples in the coding block may be split into spatial regions that are defined as planar prediction blocks, and one or more methods disclosed in this application may be applied to them.

Further, the term blocks (coding blocks, prediction blocks, etc.) as used in this document may apply to luma blocks or chroma blocks (or both), or in general to coding blocks of any component of the video.

According to a third proposed technique, a video coder may determine the availability of reference samples. For each PBG, the available reference samples may be specified as follows:

In some examples, the set of available reference samples are the same for all the prediction blocks in the coding block. There may be multiple implementations of such a system. As one example, reference sample derivation process is unchanged, and changes are made to the prediction process. The set of available reference samples is derived once for the coding block. In some examples, changes may be made to the prediction process to ensure that the reference samples may not be immediately adjacent to the prediction block, or as specified by MRLIdx relative to the prediction block.

In some examples, the reference sample derivation is changed, and no changes are made to the prediction process. In such examples, the available reference samples for a prediction block are derived from the set of available reference samples for the coding block. The derivation may result in derived values of the reference samples for the prediction block at positions that correspond with reference sample line used (i.e., based on the value of MRLIdx).

In some examples, the predicted samples from preceding PBG in decoding order are marked as unavailable.

In some examples, the processed values of previously coded PBG of the same coding block may be used for intra prediction of a PBG, in addition to the reference samples from the neighbouring coding blocks. As one example, the processed values refer to the reconstructed samples of the PBG. As another example, the processed values refer to the reconstructed samples of the PBG before loop filtering/post-filtering operations. As another example, the processed values refer to the predicted samples of the PBG.

According to a fourth proposed technique, a video coder may perform transform coding. The prediction of samples in a block may be performed by one or more methods described herein. However, the techniques in this section may also apply to coding blocks that are not predicted using generalized prediction as described above.

In some examples, the video coder may apply a transform to the residual samples in a PBG. A set of applicable shapes may be defined such that the video coder may apply a transform to all the samples of the applicable shape. For example, the applicable shape may include square and/or rectangular shapes. In some examples, transform coding of the block may be performed by taking the entire coding block as one block. In such examples, only one transform coding may apply to the samples in the coding block irrespective of the number of prediction blocks defined therein. In some examples, the video coder may apply transform coding to a PBG when the shape of the PBG is an applicable shape on which the transform may be applied. For example, if the samples in a PBG form a rectangular region, the transform may be applied to the samples of the PBG. In some examples, the video coder may apply transform coding to one or more subsets of samples in a PBG such that the samples in each such subset form an applicable shape. As one example, the subsets of the PBG may be constrained to be mutually exclusive. As another example, the subsets of the PBG collectively may be constrained to include all the samples of the PBG.

In some examples, applying a transform may also include a transform-skip decision on the block, whereby the sample values of the block are unchanged, an identity transform is applied, or a scaled identity transform is applied. As one example, a video coder may code some prediction blocks in a PBG with transform skip. In addition, the video coder may code some prediction blocks with other types of transform. The decision of applying a transform kernel or transform skip may be inferred (e.g., based on block characteristics, intra mode, neighbouring blocks) or signalled in the bitstream.

In some examples, a subblock partitioning scheme may be defined for the transform coding that is different from the prediction blocks specified. A transform block group (TBG) may be defined using transform subblocks similarly as defined for prediction blocks. One or more techniques described above may apply to TBGs. For example, when the intra sub-partitioning results in subblocks of size 2×N (prediction blocks may be of size 2×N), transform block may be defined as 1×N, and each transform block independently transform-coded. In another example, prediction blocks may be of size 2×N, prediction block groups may be of size 4×N, and transform blocks may be of size 4×N. In another example, prediction blocks may be of size 2×N, prediction block groups may be of size 4×N and transform blocks may be of size 2×N for a 8×N coding block.

According to a fifth proposed technique, a video coder may disallow certain intra modes. Several intra modes are defined (e.g., angular and non-angular) for intra prediction of blocks. For PBGs, only a subset of the intra modes may be specified to be allowed modes. In other words, certain intra modes may be disallowed for PBGs. The determination of disallowed intra modes may be reached by considering one or more of the following: (1) split direction, (2) coding block width, height, or a function of width and the height, (3) prediction block width, height, or a function of width and the height, or (4) above block characteristics of neighbouring coding blocks, and intra mode used to code the neighbouring coding blocks.

It is understood that the above description (including examples) is in no way limiting the techniques involved and may be combined with other methods that may not be described in this document. One or more determinations or indications may also depend on other conditions including tile group type, partition type, characteristics of one or more neighbouring blocks (width, height, intra mode, prediction type), etc.

Below are two specific examples of the above techniques.

In a first example, a prediction block group (PBG) is specified to have a minimum width of four samples. For example, vertical partitioning of a coding block of size 4×N may result in subblocks of width 1 or 2 and vertical partitioning of 8×N coding blocks may result in subblocks of width 2 or 4.

Figure 14:
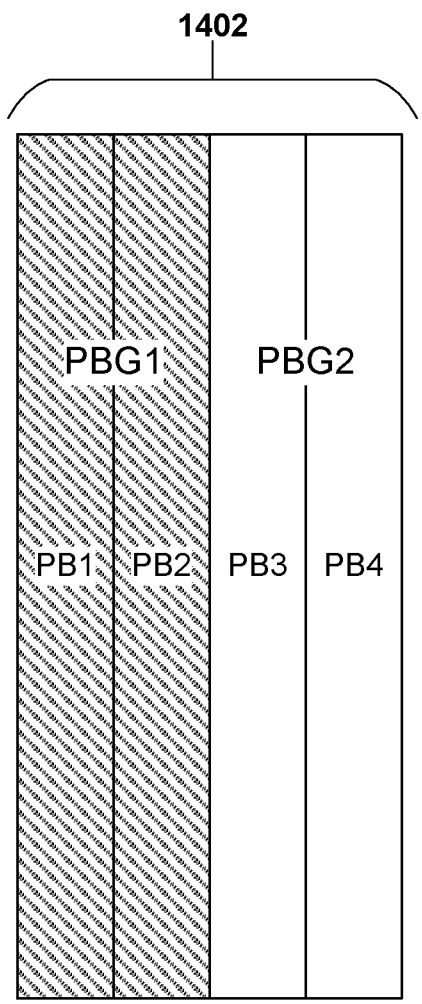
FIG. 14 is a block diagram illustrating how the coding block is split into four prediction blocks.

FIG. 14 is a block diagram illustrating how a coding block 1402 is split into four prediction blocks (PB1-PB4). In an illustrative example, coding block 1402 may be an 8×N coding block that a video coder codes with ISP and with a vertical split. In this example, prediction blocks PB1, PB2, PB3, and PB4, are of size 2×N. Prediction block groups PBG1 and PBG2 are defined with a minimum width (nW) of 4 samples. For example, PBG1 is a prediction block group of size 4×N and PBG2 is a second prediction block group of size 4×N, also. The samples of PBG1 are predicted from the neighbouring reference samples. In some examples, the predicted value of samples in PBG1 may not depend on other sample values in PBG1. The samples of PBG2 are predicted from the neighbouring reference samples and from the predicted samples of PBG1.

In some examples, the transform block (e.g., transform unit (TU)) may be defined to be of the same size as the prediction block. For example, the video coder may determine a size of the TU to be equal to a size of any one prediction block included in a PBG.

In some examples, the samples of PBG2 may be predicted from reference samples from neighbouring coding blocks and from reconstructed samples belonging to the area of PBG1, or only from the reference samples from neighbouring coding blocks.

Figure 15:
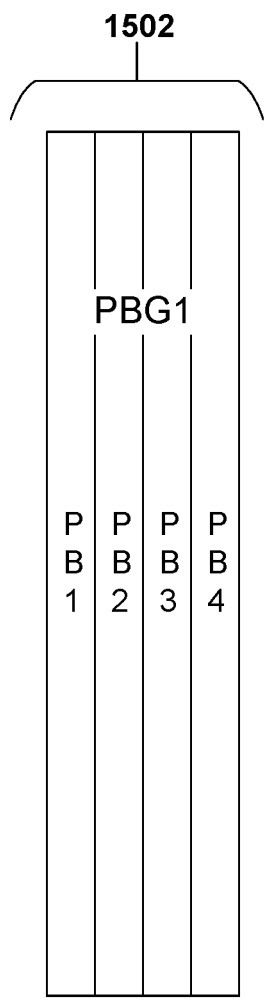
FIG. 15 is a block diagram illustrating an example where a 4×N coding block is coded with intra sub-partitions and vertical partitioning.

FIG. 15 is a block diagram illustrating an example where a video coder may code coding block 1502 with ISP and vertical partitioning. In an illustrative example, coding block 1502 may be a 4×N coding block. In such examples, the prediction blocks (PB1-PB4) may be of size 1×N. In some examples, a PBG may be defined to have a width of at least four samples. In such examples, the video coder may group the four prediction blocks (PB1-PB4) into one prediction block group (e.g., PBG1). As such, PBG1 may be a PBG of size 4×N.

In some cases, the generalized prediction (specifying prediction blocks and prediction block groups described herein) only applies to a subset of blocks that satisfy one or more criteria, which may depend on block size, block shapes, subblock width and heights, intra modes, etc. For example, the condition may only apply to coding blocks that generate subblocks that have a width less than or equal to 2. In other cases, the condition may apply to subblocks that have a total number of samples less than or equal to 32 samples.

In another example, the samples of all prediction blocks of a coding block are predicted from the reconstructed reference samples of the neighbouring coding blocks. In such examples, there is no dependency of prediction within prediction blocks of the coding unit. In some examples, the transform unit size may be equal to the size of the prediction block.

Figure 16:
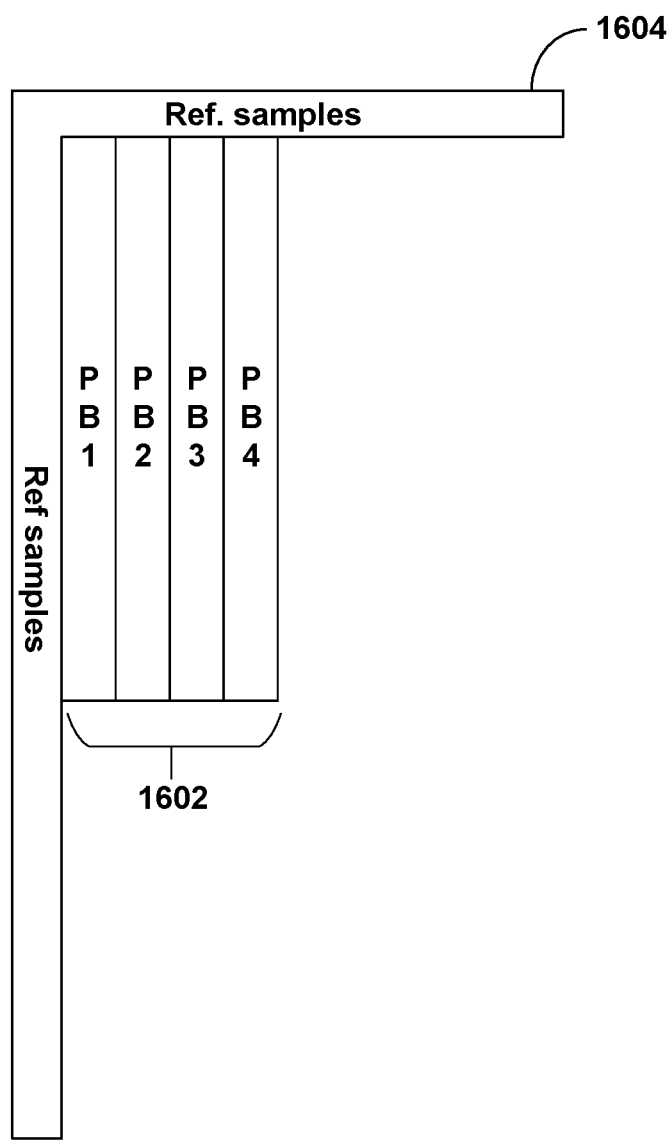
FIG. 16 is a conceptual diagram illustrating an example where an M×N coding block is split into four prediction blocks.

FIG. 16 is a conceptual diagram illustrating an example where an M×N coding block 1602 is split into four prediction blocks (e.g., PB1-PB4). In the illustrative example, the prediction blocks (PB1-PB4) have a size of (M/4)×N. The reference samples 1604 are used as the reference samples for the four prediction blocks. There is no dependence between the predicted samples of one prediction block to the other. For example, there is no dependence between the predicted samples of PB1 and the predicted samples of PB2, PB3, or PB4.

In some cases, the four predicted subblocks may be predicted in parallel. In another example, the four subblocks (PB1-PB4) may be considered together as one block for prediction. For example, the four subblocks (PB1-PB4) may be considered together as one PBG for prediction.

In some examples, a video coder may predict the samples of some coding blocks using at least one prediction block group having a width of four samples, and some other coding units are predicted with restricted intra modes. The following restrictions are added in the specification that apply to the coding of 4×N coding blocks and 8×N coding blocks that are coded with ISP.

For 4×N coding blocks split vertically with ISP where N>4, only the vertical mode may be allowed for intra prediction. This ensures that the prediction of any of the sub-partitions (1×N sub-partitions in case of 4×N coding block with N>8 and 2×N sub-partitions in case of 4×8 coding block) would be independent of the other sub-partitions in the coding block. In this way, a video coder may perform prediction of the sub-partitions in parallel or by considering all the sub-partitions as a 4×N block for prediction. The intra mode may not be signalled for such coding blocks.

Figure 17:
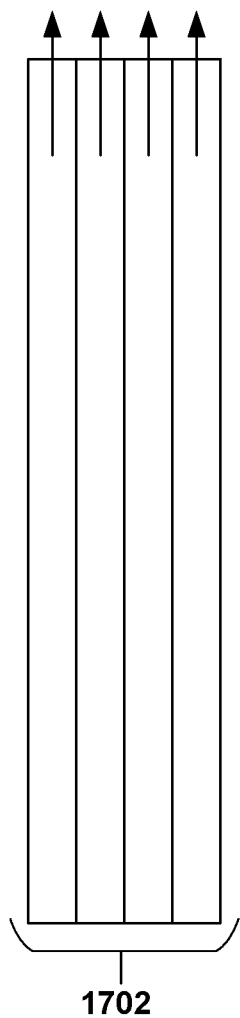
FIG. 17 is a conceptual diagram illustrating an example in which only a vertical intra mode prediction is allowed for 4×N coding blocks that are coded with intra sub-partition coding (ISP) and vertical split.

FIG. 17 is a conceptual diagram illustrating an example in which a video coder is only allowed to perform vertical intra (VER Intra) mode prediction for a 4×N coding block 1702 that the video coder codes with ISP and vertical split. That is, FIG. 17 shows an example of how the vertically split sub-partitions of a 4×N coding block 1702 may only use vertical intra mode for prediction. In the illustrative example, coding block 1702 may have a height of at least an 8-sample size (N>8). In such examples, coding block 1702 may be split into four 1×N subpartitions (e.g., subblocks, prediction blocks). In any case, the inverse transform operation is still performed at the 1×N sub-partition level.

Figure 18:
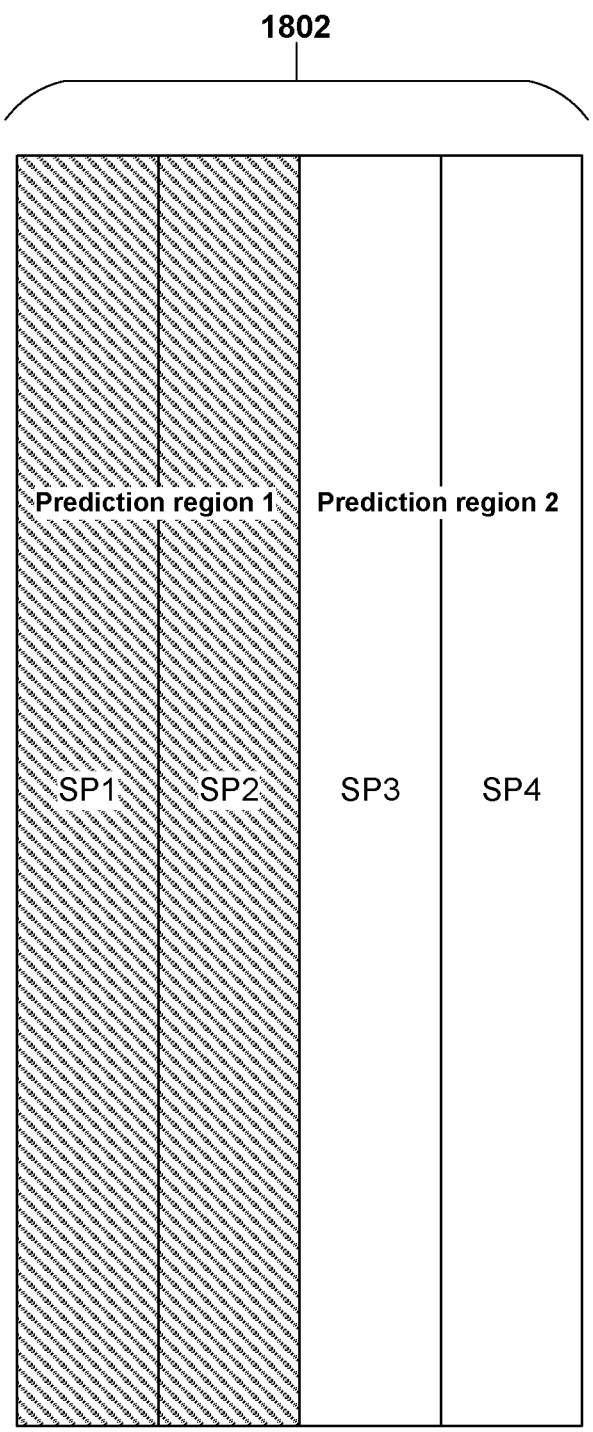
FIG. 18 is a conceptual diagram illustrating an example in which an 8×N (N>4) coding block coded with ISP and split vertically.

For 8×N coding blocks split vertically with ISP where N>4, the prediction of samples is performed on prediction block groups (PBG) four samples in width. For example, when the coding block size is 8×N (N>4), a video coder may identify two PBGs to each have a size of 4×N. FIG. 18 shows an example of how an 8×N sub-partition is split into two prediction regions (PBG1 or region 1 and PBG2 or region 2) of size 4×N each, and four transforms of size 2×N each. In the example of FIG. 18, a video coder may code an 8×N (N>4) coding block 1802 with ISP and vertical split. In such examples, the video coder may perform prediction on 4×N prediction regions (or PBG). In addition, the transform (SP) size may be 2×N. In some examples, the prediction of the region 2 is dependent on the reconstruction of the region 1. Thus, the prediction of any sample within the coding block 1802 is only dependent on reconstructed samples from neighbouring coding blocks and preceding 4×N prediction regions.

In FIG. 17, the four-line residuals of size 1×N and similarly in FIG. 18, within one prediction region (prediction region 1 or 2), and the two residual blocks of 2×N can be generated in parallel or together in one step. For example, the vertical inverse transform operation of the two 2×N sub-partitions within each prediction region may be performed by considering the region as a 4×N block because the vertical transform for all the sub-partitions in ISP is identical. The horizontal transform may also be done for the 2×N sub-partitions in parallel, either by separate processing, or by considering the two sub-partitions as a single 4×N block and the horizontal inverse transform operation as a combination of the two smaller horizontal inverse transform operations.

Table 6 below summarizes the partition sizes for prediction sizes and transform sizes. In some examples, the prediction sizes and transform sizes may be different for other coding block sizes. For example, the prediction and transform sizes may be as specified for ISP in VVC WD4.

TABLE 6

Example partition sizes for prediction sizes and transform sizes

| Coding block sizes | Partition sizes for prediction | Transform sizes |
|---|---|---|
| 4 × 8 | 4 × 8 (vertical mode only) | 2 × N |
| 4 × N (N > 8) | 4 × N (vertical mode only) | 1 × N |
| 8 × N (N > 4) | 4xN | 2 × N |

Changes to relevant sections of the specification in the fifth working draft of VVC (hereinafter "VVC WD5" and available at phenix.it-sudparis.eu/jvet/doc_end_user/documents/14_Geneva/wg11/JVET-N1001-v8.zip, are provided below with change marks. Deleted items are shown with strikethrough and added items are shown with bold italics.

In some examples, a video encoder may use the following inputs in order to perform a coding process:

1. a sample location (xTb0, yTb0) specifying the top-left sample of the current transform block relative to the top-left sample of the current picture, 2. a variable nTbW specifying the width of the current transform block, 3. a variable nTbH specifying the height of the current transform block, 4. a variable predModeIntra specifying the intra prediction mode, and 5. a variable cIdx specifying the colour component of the current block.

Output of the process is a modified reconstructed picture before in-loop filtering.

The maximum transform block size maxTbSize is derived using Eq. 2, as follows:

$$\text{max TbSize}=(\text{cIdx}==0)?\text{ Max TbSizeY}:\text{Max TbSizeY}/2 \qquad (2)$$

The luma sample location is derived using Eq. 3, as follows:

$$(xTbY,yTbY)=(cIdx==0)?(xTb0,yTb0):(xTb0*2, yTb0*2) \qquad (3)$$

Depending on maxTbSize, the following applies:

If IntraSubPartitionsSplitType is equal to NO_ISP_SPLIT and nTbW is greater than maxTbSize or nTbH is greater than maxTbSize, the following ordered steps apply (1. through 5.):

1. The variables newTbW and newTbH are derived as follows:

$$newTbW=(nTbW>\text{max TbSize})?(nTbW/2):nTbW$$
and
$$newTbH=(nTbH>\text{max TbSize})?(nTbH/2):nTbH.$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

3. If nTbW is greater than maxTbSize, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

4. If nTbH is greater than maxTbSize, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

5. If nTbW is greater than maxTbSize and nTbH is greater than maxTbSize, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

Otherwise, the following ordered steps apply (1. and 2.). The variables For example, when a video coder determines that IntraSubPartitionsSplitType is not equal to ISP_NO_SPLIT (e.g., when IntraSubPartitionsSplitType is equal to either ISP_VER_SPLIT or ISP_HOR_SPLIT) or when nTbW and nTbH are both less than or equal to maxTbSize, the video coder may derive the following variables.

1. In some examples, a video coder may derive a plurality of variables, including nW, nH, xPartIncrement, yPartIncrement, nPbW and pbFactor. For example, the video coder may derive such variables using Eqs. (6) through (11), as follows:

$$nW=\text{IntraSubPartitionsSplitType}==\text{ISP\_VER\_SPLIT}?nTbW/\text{NumIntraSubPartitions}:nTbW \qquad (6)$$

$$nH=\text{IntraSubPartitionsSplitType}==\text{ISP\_HOR\_SPLIT}?nTbH/\text{NumIntraSubPartitions}:nTbH \qquad (7)$$

$$xPartIncrement=\text{ISP\_VER\_SPLIT}?1;0 \qquad (8)$$

$$yPartIncrement=\text{ISP\_HOR\_SPLIT}?1;0 \qquad (9)$$

$$nPbW=\max(4,nW) \qquad (10)$$

$$pbFactor=nPbW/nW \qquad (11)$$

2. In addition, variables xPartIdx and yPartIdx are set equal to 0.

In such examples, a video coder may apply the following ordered steps (1. through 4.) successively for i=0 . . . NumIntraSubPartitions−1:

1. The variables xPartIdx, yPartIdx, and xPartPbIdx are updated as follows:

xPartIdx=xPartIdx+xPartIncrement (12)

yPartIdx=yPartIdx+yPartIncrement (13)

xPartPbIdx=xPartIdx % pbFactor (14)

2. In some examples, when xPartPbIdx is equal to 0, a video coder may invoke an intra sample prediction process as specified in clause 8.4.5.2. In such examples, video coder may invoke the intra sample prediction process with the location (xTbCmp, yTbCmp) set equal to (xTb0+nW*xPartIdx, yTb0+nH*yPartIdx), the intra prediction mode predModeIntra, the transform block width nTbW and height nTbH set equal to nPbW and nH, the coding block width nCbW set equal to nTbW and the coding block height nCbH set equal to nTbH, and the variable cIdx as inputs, and the output is an (nPbW)×(nH) array predSamples (e.g., prediction sample array).

3. The scaling and transformation process as specified in clause 8.7.2 is invoked with the luma location (xTbY, yTbY) set equal to (xTbY+nW*xPartIdx, yTbY+nH*yPartIdx), the variable cIdx, the transform width nTbW and the transform height nTbH set equal to nW and nH as inputs, and the output is an (nPbW)×(nH) array resSamples (e.g., residual sample array). In one example, the output may be an (nW)×(nH) array resSamples.

4. The picture reconstruction process for a colour component as specified in clause 8.7.5 is invoked with the transform block location (xTbComp, yTbComp) set equal to (xTb0+nW*xPartIdx, yTb0+nH*yPartIdx), the transform block width nTbW, the transform block height nTbH set equal to nW and nH, the variable cIdx, the (nW)×(nH) array predSamples[x][y] with x=xPartPbIdx*nW . . . (xPartPbIdx+1)*nW−1, y=0 . . . nH−1, and the (nW)×(nH) array resSamples as inputs, and the output is a modified reconstructed picture before in-loop filtering.

In some examples, the following changes may restrict intra prediction mode to vertical intra mode for some block sizes. Example changes are made to the signalling in Section 7.3.7.5 of VVC WD5. Deleted items are shown with strikethrough and added items are shown with italics.

TABLE 7

Restrict prediction mode

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|      !( cbWidth == 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] == 0 && slice_type != I | |
|      && !( cbWidth == 4 && cbHeight == 4 ) ) | |
|       pred_mode_flag | ae(v) |
|     if( ( ( slice_type == I && cu_skip_flag[ x0 ][ y0 ] ==0 ) \|\| | |
|      ( slice_type != I && ( CuPredMode[ x0 ][ y0 ] != MODE_INTRA \|\| | |
|      ( cbWidth == 4 && cbHeight == 4 && cu_skip_flag[ x0][ y0 ] == 0 ) ) ) ) && | |
|      sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][ y0 ] == MODE_INTRA ) { | |
|     if( sps_pcm_enabled_flag && | |
|      cbWidth >= MinIpcmCbSizeY && cbWidth <= MaxIpcmCbSizeY && | |
|      cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|      while( !byte_aligned( ) ) | |
|       pcm_alignment_zero_bit | f(1) |
|      pcm_sample( cbWidth, cbHeight, treeType) | |
|     } else { | |
|      if( treeType == SINGLE_TREE \|\| treeType == DUAL_TREE_LUMA ) { | |
|       if( cbWidth <= 32 && cbHeight <= 32 ) | |
|        intra_bdpcm_flag[ x0 ][ y0 ] | ae(v) |
|       if( intra_bdpcm_flag[ x0 ][ y0 ] ) | |
|        intra_bdpcm_dir_flag[ x0 ][ y0 ] | ae(v) |
|       else { | |
|        if( sps_mip_enabled_flag && | |
|         ( Abs( Log2( cbWidth) − Log2( cbHeight ) ) <= 2 ) && | |
|         cbWidth <= MaxTbSizeY && cbHeight <= MaxTbSizeY ) | |
|          intra_mip_flag[ x0 ][ y0 ] | ae(v) |
|        if( intra_mip_flag[ x0 ][ y0 ] ) { | |
|         intra_mip_mpm_flag[ x0 ][ y0 ] | ae(v) |
|         if( intra_mip_mpm_flag[ x0 ][ y0 ] ) | |
|          intra_mip_mpm_idx[ x0 ][ y0 ] | ae(v) |
|         else | |
|          intra_mip_mpm_remainder[ x0 ][ y0 ] | ae(v) |
|        } else { | |
|         if( sps_mrl_enabled_flag && ( ( y0 % CtbSizeY ) > 0 ) ) | |
|          intra_luma_ref_idx[ x0 ][ y0 ] | ae(v) |
|         if ( sps_isp_enabled_flag && intra_luma_ref_idx[ x0 ][ y0 ] == 0 && | |
|          ( cbWidth <= MaxTbSizeY && cbHeight <= MaxTbSizeY ) && | |

TABLE 7-continued

Restrict prediction mode

|  | Descriptor |
|---|---|
| ( cbWidth * cbHeight > MinTbSizeY * MinTbSizeY ) ) | |
|     intra_subpartitions_mode_flag[ x0 ][ y0 ] | ae(v) |
| if( intra_subpartitions_mode_flag[ x0 ][ y0 ] = = 1 && | |
|     cbWidth <= MaxTbSizeY && cbHeight <= MaxTbSizeY ) | |
|     intra_subpartitions_split_flag[ x0 ][ y0 ] | ae(v) |
| *if( !( IntraSubPartitionsSplitType = = ISP_VER_SPLIT &&* | |
|     *cbWidth = = 4 ) ) {* | |
|     if( intra_luma_ref_idx[ x0 ][ y0 ] = = 0 && | |
|         intra_subpartitions_mode_flag[ x0 ][ y0 ] = = 0 ) | |
|         intra_luma_mpm_flag[ x0 ][ y0 ] | ae(v) |
|     if( intra_luma_mpm_flag[ x0 ][ y0 ] ) { | |
|         if( intra_luma_ref_idx[ x0 ][ y0 ] = = 0 ) | |
|             intra_luma_not_planar_flag[ x0 ][ y0 ] | ae(v) |
|         if( intra_luma_not_planar_flag[ x0 ][ y0 ] ) | |
|             intra_luma_mpm_idx[ x0 ][ y0 ] | ae(v) |
|     } else | |
|         intra_luma_mpm_remainder[ x0 ][ y0 ] | ae(v) |
|     } | |
|   } | |
| } | |
| if( treeType = = SINGLE_TREE | | treeType = = DUAL_TREE_CHROMA ) | |
|     intra_chroma_pred_mode[ x0 ][ y0 ] | ae(v) |
| } | |
| } else if( treeType != DUAL_TREE_CHROMA ) { /* MODE_INTER or MODE_IBC | |
| */ | |
| ... | |
| } | |

Example changes are made to the Derivation Process for luma intra prediction mode in Section 8.4.3 of VVC WD5. Deleted items are shown with strikethrough and added items are shown with italics.

For example, a video coder may perform a derivation process for luma intra prediction mode. Inputs to this process include: (1) a luma location (xCb, yCb) specifying the top-left sample of the current luma coding block relative to the top-left luma sample of the current picture, (2) a variable cbWidth specifying the width of the current coding block in luma samples, and/or (3) a variable cbHeight specifying the height of the current coding block in luma samples.

In this process, based on the inputs above, a video coder may derive the luma intra prediction mode IntraPredModeY [xCb][yCb].

Table 8 specifies the value for the intra prediction mode IntraPredModeY[xCb][yCb ] and the associated names. It should be noted that intra prediction modes INTRA_LT_C-CLM, INTRA_L_CCLM and INTRA_T_CCLM may only be applicable to chroma components.

TABLE 8

Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

IntraPredModeY[xCb][yCb] is derived as follows: If BdpcmFlag[xCb][yCb] is equal to 1 or intra_luma_not_planar_flag[xCb][yCb] is equal to 0, IntraPredModeY[xCb][yCb] is set equal to INTRA_PLANAR. Otherwise if Intra-SubPartitionsSplitType is equal to ISP_VER_SPLIT and cbWidth is equal to 4, IntraPredmodeY[xCb][yCb] is set equal to INTRA_ANGULAR50. Otherwise (e.g., intra_luma_not_planar_flag[xCb][yCb] is equal to 1), the neighbouring locations (xNbA, yNbA) and (xNbB, yNbB) are set equal to (xCb−1, yCb+cbHeight−1) and (xCb+cbWidth−1, yCb−1), respectively.

Figure 19A:
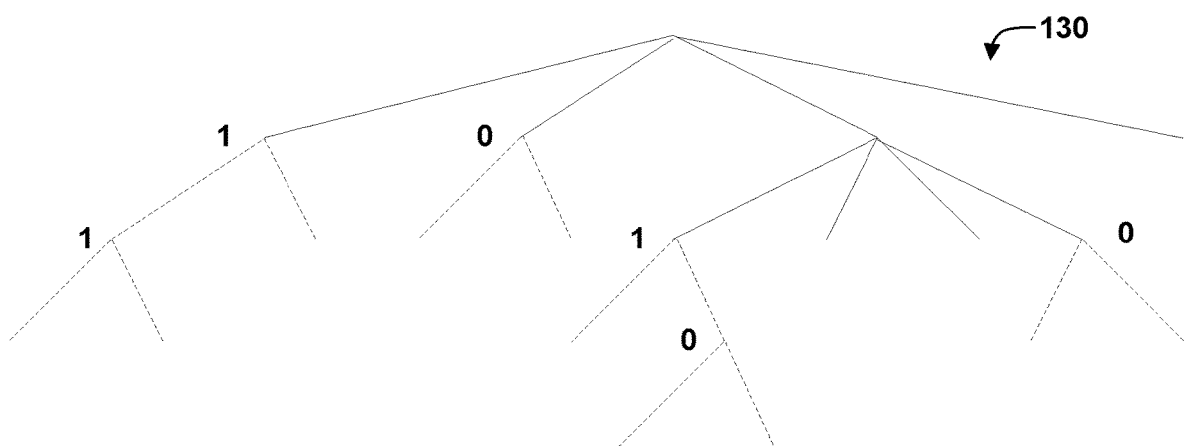
FIGS. 19A and 19B are conceptual diagrams illustrating an example quadtree binary tree (QTBT) structure, and a corresponding coding tree unit (CTU).
Figure 19B:
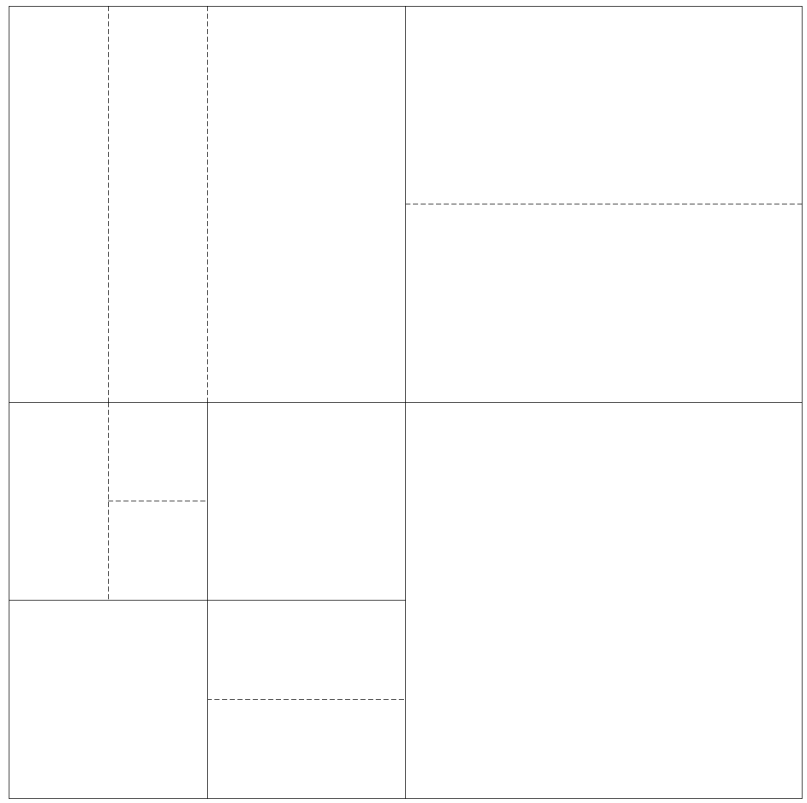

FIGS. 19A and 19B are conceptual diagram illustrating an example QTBT structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type is used (e.g., horizontal, vertical, etc.). In an illustrative and non-limiting example, a value of 0 may indicate horizontal splitting and a value of 1 may indicate vertical splitting. In another example involving quadtree splitting, there may be no need to indicate the splitting type because quadtree nodes, in general, split a block horizontally and vertically into 4 sub-blocks (e.g., prediction blocks). In such examples, the sub-blocks may or may be of equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 19B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks," "coding blocks," or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the node will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 20:
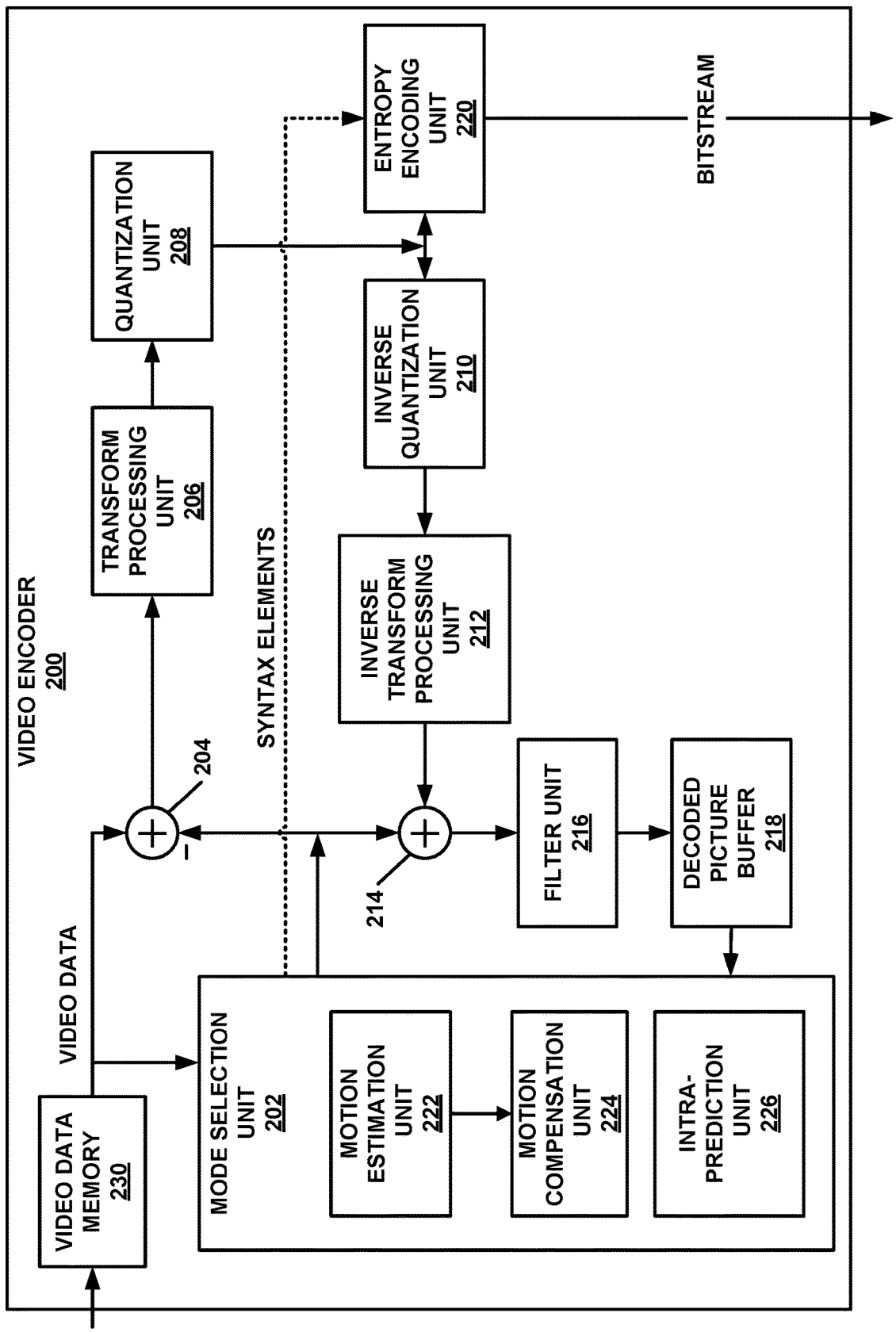
FIG. 20 is a block diagram illustrating an example video encoder that may perform the techniques of this disclosure.

FIG. 20 is a block diagram illustrating an example video encoder 200 that may perform the techniques of this disclosure. FIG. 20 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 20, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 20 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, such as through sample-by-sample averaging or weighted averaging.

As another example, for intra-prediction or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 may be configured to perform any of the prediction block grouping techniques described in this disclosure. For instance, intra-prediction unit 226 may perform ISP coding to partition a coding unit (CU) to subblocks (e.g., prediction blocks). In addition, intra-prediction unit 226 may group the subblocks into prediction block groups. In this way, video encoder 200 may be considered to include one or more processors implemented in circuitry and configured to perform splitting (e.g., vertical splitting) of a coding unit (CU) of video data using intra sub-partition (ISP) to form a set of prediction blocks. The prediction blocks may include at least a first prediction block and a second prediction block. Video encoder 200 may then group a plurality of the set of prediction blocks into a first prediction block group (PBG). In addition, video encoder 200 may reconstruct samples of prediction blocks included in the first PBG independently of samples of other prediction blocks included in the first PBG.

Figure 21:
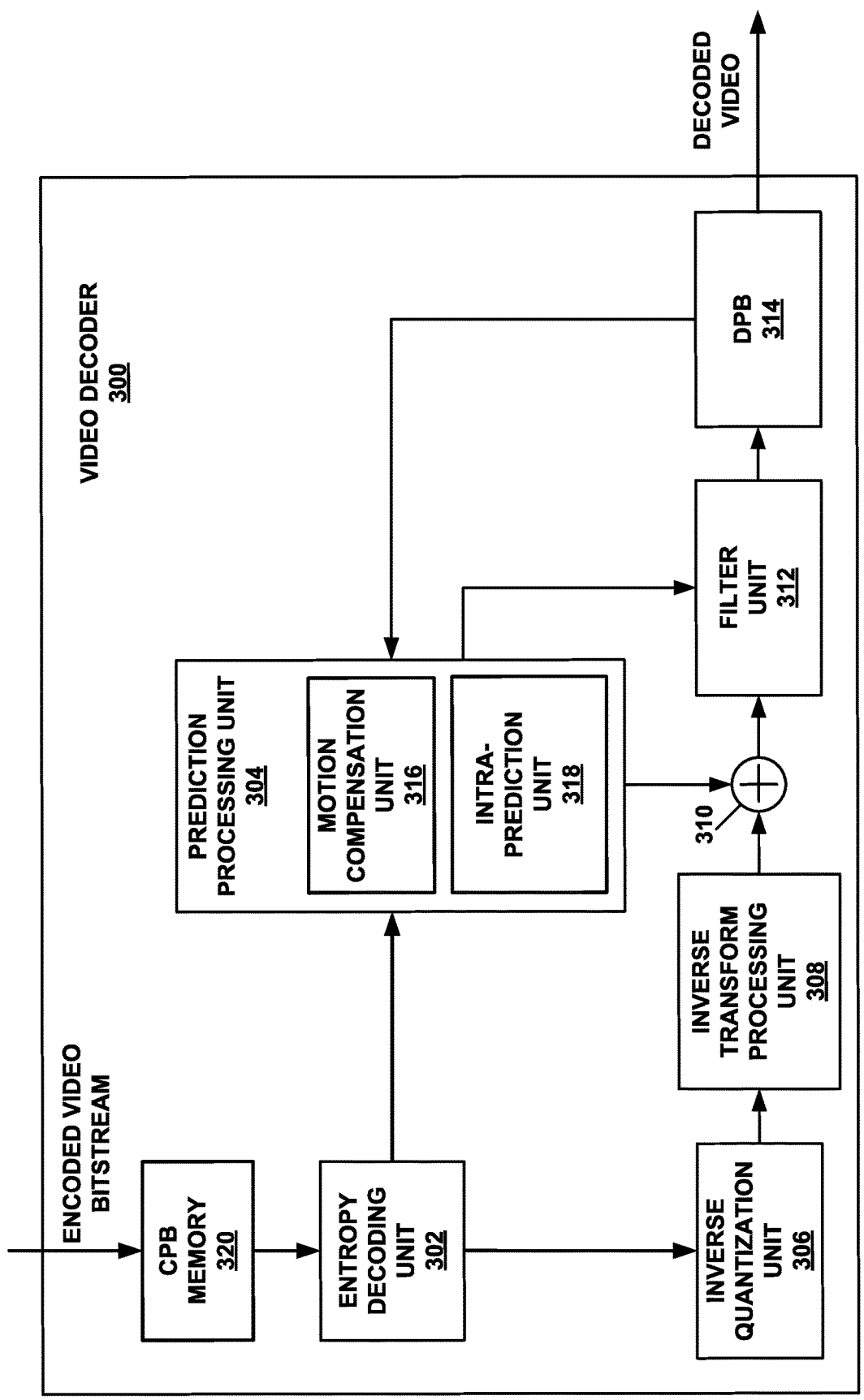
FIG. 21 is a block diagram illustrating an example video decoder that may perform the techniques of this disclosure.

FIG. 21 is a block diagram illustrating an example video decoder 300 that may perform the techniques of this disclosure. FIG. 21 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 21, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 21 are illustrated to assist with understanding the operations performed by video decoder 300. The units may be implemented as fixed-function circuits, programmable circuits, or a combination thereof. Similar to FIG. 20, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 20).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 20). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 may be configured to perform any of the prediction block grouping techniques described in this disclosure. For instance, intra-prediction unit 318 may perform ISP coding to partition a coding unit (CU) to subblocks (e.g., prediction blocks). In addition, intra-prediction unit 318 may group the subblocks into prediction block groups. In this way, video decoder 300 may be considered to include one or more processors implemented in circuitry and configured to perform splitting (e.g., vertical splitting) of a coding unit (CU) of video data using intra sub-partition (ISP) to form a set of prediction blocks. The prediction blocks may include at least a first prediction block and a second prediction block. Video decoder 300 may group a plurality of the set of prediction blocks into a first prediction block group (PBG). In addition, video decoder 300 may reconstruct samples of prediction blocks included in the first PBG independently of samples of other prediction blocks included in the first PBG.

Figure 22:
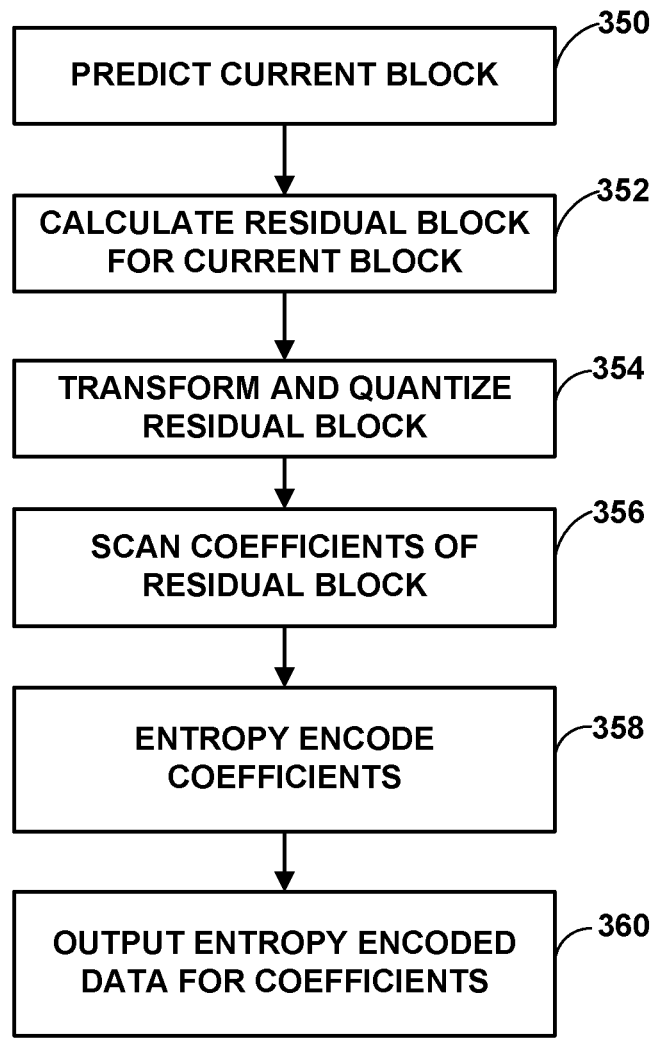
FIG. 22 is a flowchart illustrating an example method for encoding a current block.

FIG. 22 is a flowchart illustrating an example method for encoding a current block. The current block may comprise a current CU. Although described with respect to video encoder 200 (FIGS. 1 and 20), it should be understood that other devices may be configured to perform a method similar to that of FIG. 22.

In this example, video encoder 200 initially predicts the current block (350). For example, video encoder 200 may form a prediction block for the current block. Video encoder 200 may then calculate a residual block for the current block (352). In other words, video encoder 200 may calculate luma residual data and chroma residual data for the current block. To calculate a residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). Video encoder 200 may implement a reconstruction loop. For instance, video encoder 200 may implement a reconstruction loop to reconstruct coded video data using the prediction block grouping techniques described in this disclosure.

Figure 23:
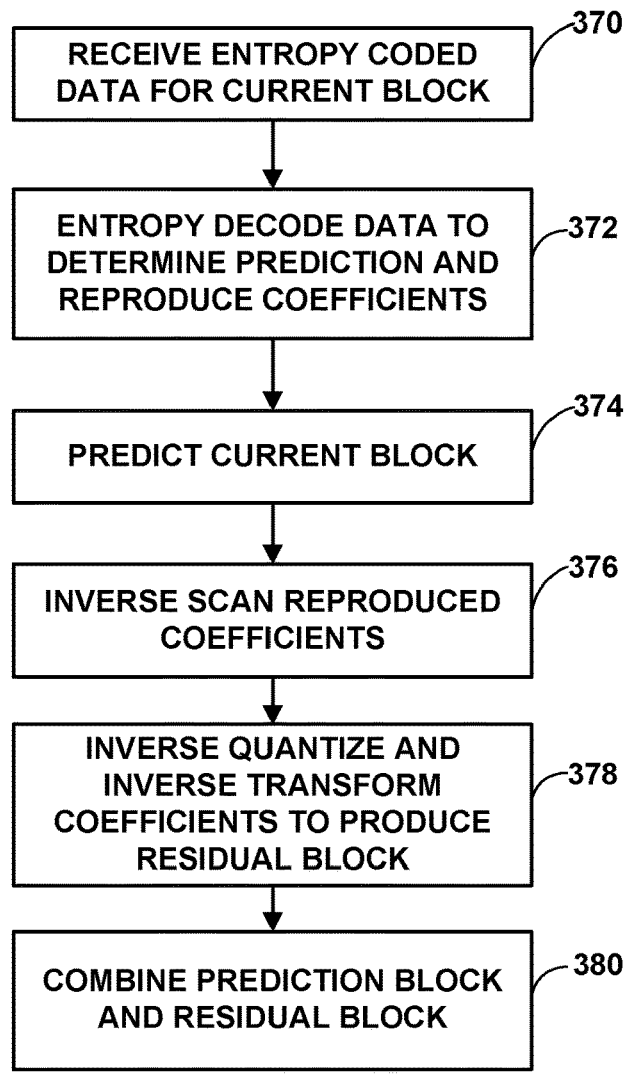
FIG. 23 is a flowchart illustrating an example method for decoding a current block.

FIG. 23 is a flowchart illustrating an example method for decoding a current block of video data. The current block may comprise a current CU. Although described with respect to video decoder 300 (FIGS. 1 and 21), it should be understood that other devices may be configured to perform a method similar to that of FIG. 23.

Video decoder 300 may receive entropy coded data for the current block, such as entropy coded prediction information and entropy coded data for transform coefficients of a residual block corresponding to the current block (370). Video decoder 300 may entropy decode the entropy coded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380). Video decoder 300 may reconstruct samples of the current block using the prediction block grouping techniques described in this disclosure.

Figure 24:
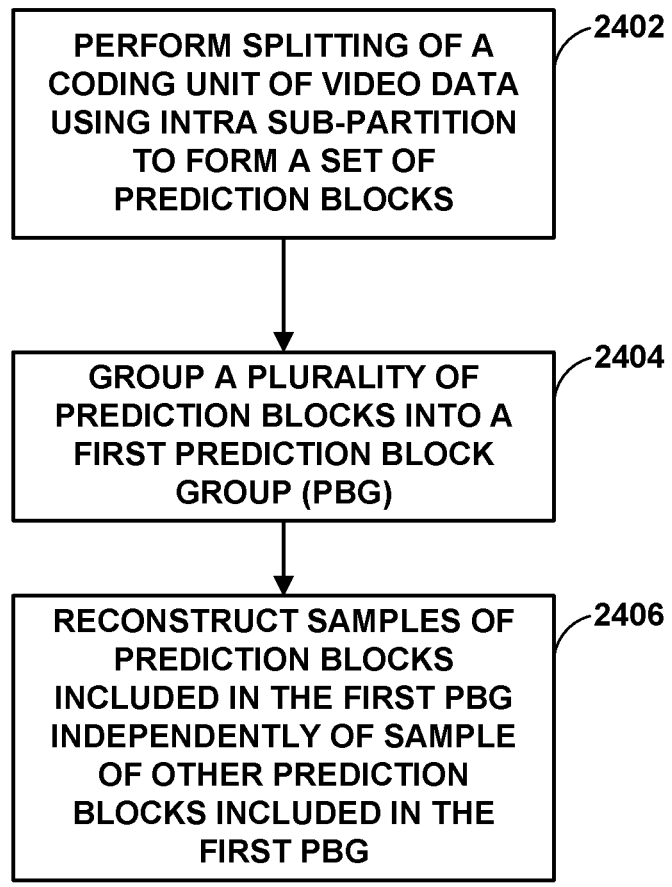
FIG. 24 is a flowchart illustrating an example method for performing prediction block grouping on a current block of video data.

FIG. 24 is a flowchart illustrating an example method for performing prediction block grouping on a current block of video data. The current block may comprise a current CU. Although described with respect to video encoder 200 (FIGS. 1 and 20) and/or video decoder 300 (FIGS. 1 and 21), it should be understood that other devices may be configured to perform a method similar to that of FIG. 24.

In some examples, a video coder (e.g., video encoder 200 and/or video decoder 300) may perform splitting (e.g., vertical splitting) of a coding unit (CU) of video data using intra sub-partition (ISP). For example, the video coder may perform vertical and/or horizontal splitting of a first CU to form a set of prediction blocks (2402). In an illustrative example, the video coder may perform vertical splitting of a first CU to form a set of prediction blocks. In any case, the set of prediction blocks may include all prediction blocks of the CU or only a subset of the prediction blocks of the CU. That is, the video coder may form a set of prediction blocks that does not necessarily include all prediction blocks of the CU. For example, the video coder may perform splitting of the first CU to form a first set of prediction blocks and one or more other sets of prediction blocks. The one or more other sets of prediction blocks may be mutually exclusive of one another and of the first set of prediction blocks. In some examples, the sets of prediction blocks may overlap with one another to some extent, such that one portion of a CU may be partitioned into more than one prediction block. While various techniques of this disclosure describe video coders partitioning CUs into a set of prediction blocks, the techniques of this disclosure are not so limited, and a video coder may partition a CU into multiple sets of prediction blocks.

In some examples, the prediction blocks of a set of prediction blocks may include at least a first prediction block and a second prediction block (e.g., at least two vertical prediction blocks). In some examples, the first prediction block comprises a sample width of less than or equal to two. For example, the first prediction block may have a sample width of 1 or 2. In addition, the second prediction block may have a sample width of 1 or 2. In some examples, the first prediction block and the second prediction block may have a same width. For example, the first prediction block and the second prediction block may both have a sample width of 2. In some examples, however, the first prediction block and the second prediction block may have different widths, such as first prediction block having a width of 2 and the second prediction block having a width of 1. In such examples, a third prediction block may be included in the first PBG, such that the first PBG may have a width of at least a 4 sample size.

In some examples, the video coder may group, from a set of prediction blocks, a plurality of prediction blocks into a first prediction block group (PBG) (2404). In an example, the video coder may group one or more prediction blocks from a first set of prediction blocks into a first PBG. For example, the video coder may group, from the first set of prediction blocks, a first prediction block and a second prediction block into a first PBG. In some example, the first PBG may only include one prediction block from the first set of prediction blocks.

In some examples, the video coder may group a first set of prediction blocks of a CU to form one or more PBGs. In such examples, the video coder may group the PBGs similarly or differently relative to one or more other sets of prediction blocks of the same CU. For example, the video coder may group, into a first PBG, at least one vertical prediction block from a first set of prediction blocks and at least one horizontal prediction block from the same set of prediction blocks. In such examples, the video coder may group, into a second PBG, at least one vertical prediction block from a second set of prediction blocks and at least one horizontal prediction block from the second set of prediction blocks. In some examples, however, the video coder may instead group, into the second PBG, only vertical prediction blocks from the second set of prediction blocks and/or only horizontal prediction blocks from the second set of prediction blocks, where the first set of prediction blocks includes only vertical subblocks, only horizontal subblocks, a mix of vertical and horizontal blocks, etc., and the second set of prediction blocks includes only vertical subblocks, only horizontal subblocks, a mix of vertical and horizontal blocks, etc. In some examples, the video coder may only group a particular type of prediction blocks into PBGs. In a non-limiting example involving a CU partitioned using multiple split types (e.g., vertical and horizontal splitting of a single CU), the video coder may only group, into PBGs, those prediction blocks that are the result of the vertical splitting part of the overall splitting scheme. As such, the video coder may forego grouping prediction blocks that the video coder partitioned differently (e.g., using horizontal splitting). In another example, the video coder may form groups that include a vertical prediction block and one or more horizontal prediction blocks that neighbor the vertical prediction block. The video coder may additionally form groups including any leftover prediction blocks (e.g., non-neighboring prediction blocks) or may determine not to form groups for certain prediction blocks in the one or more sets of prediction blocks of a CU. In addition, the video coder may only group prediction blocks that are of a particular size (e.g., a size that satisfies a predefined size threshold).

In some examples, a PBG may be specified to have a minimum dimension of nW samples. For example, the PBG may have a minimum width of four samples (e.g., nW=4). That is, the first PBG may have a sample size width of at least four. In such cases, if the dimension size of the subblocks is less than nW, then one or more prediction blocks that are adjacent may be treated as one PBG of dimension size nW samples. The dimension size may apply to the height, width or a function derived from the height and width (e.g., width*height).

The video coder may reconstruct samples of prediction blocks included in the first PBG independently of samples of other prediction blocks included in the first PBG (2406). A video coder may reconstruct samples of prediction blocks independently of other prediction blocks within a PBG when the video coder reconstructs one sample from one subblock without accessing, reading, or performing other memory access procedures to identify or reconstruct samples in another subblock within the same PBG. As a corollary, a video coder may reconstruct samples from one group that are dependent on the reconstruction of samples from another group when the video coder performs a sequential operation. That is, the sequential operation involves first reconstructing one or more samples from a first group and then reconstructing one or more samples from another group based on the samples from the first group. In some instances, independent reconstruction may involve a parallel procedure in which a video coder reconstructs samples from a first prediction block of a first PBG in parallel with, or at substantially the same time (e.g., without a necessary time delay), as the video coder reconstructs samples from a second prediction block that is in the same first PBG.

In an example where a first PBG includes a first prediction block and a second prediction block, the video coder may reconstruct samples of the first prediction block independently of samples of the second prediction block. In some examples, when certain filtering operations are applied on predicted blocks that may result in a dependence between the predicted value of samples within a PBG, the restriction of prediction dependence of samples within a PBG may still be considered valid as long as the regular intra prediction (without the post-prediction filtering operations) do not result in a dependence. For example, the restriction may not apply to dependence due to PDPC, boundary filtering or other similar operations.

In some examples, a video coder may form a second PBG, such that a single CU includes at least two PBGs. For example, the video coder may group one or more prediction blocks into a first PBG. Similarly, the video coder may group a second set of prediction blocks into a second PBG. The prediction blocks of each PBG may include a non-overlapping set of prediction blocks. That is, the prediction blocks of one PBG may be mutually exclusive of the prediction blocks of another PBG. In any case, the video coder may reconstruct samples of prediction blocks included in the second PBG independently of samples of other prediction blocks included in the second PBG.

In addition, the video coder may, in some examples, reconstruct samples of prediction blocks included in a second PBG based on samples of the prediction blocks included in the first PBG. That is, the reconstruction of samples in one PBG may be dependent on the reconstruction of samples in another PBG. In such examples, the video coder may still maintain the prediction independence of samples within a single PBG. In some examples, the prediction of samples included in the second PBG may not be based on the prediction blocks included in the first PBG, but instead may be based on the prediction blocks included in another CU, such as a neighboring CU.

In some examples, the video coder may divide the CU into one or more transform blocks. In such examples, a size of the transform block may be equal to a size of the first prediction block or any one prediction block of the CU. In some examples, the size of the transform block may be less than the size of the smallest prediction block included in the first PBG. Furthermore, the size of the transform block may be less than the size of the aggregate total size of the prediction blocks included in the first PBG. In another example, the transform block may have a size that is equal to the size of the PBG. In any case, a first transform block associated with the first PBG may have a size equal to the size of a first prediction block or a second prediction block included in the first PBG.

In some examples, a video coder may generate a prediction sample array having a width equal to an aggregated width of at least the first prediction block and the second prediction block. For example, the video coder may output an array of size (nPbW)×(nH). In some examples, the video coder may, when reconstructing samples of prediction blocks, generate the prediction sample array having a width equal to an aggregated width of at least the first prediction block and the second prediction block.

In some examples, a video coder may determine a quantity of prediction block groups based on a width of the coding unit and a width of the first prediction block. The video coder may code the CU in accordance with the quantity of prediction block groups such that the CU comprises the quantity of prediction block groups. The quantity of prediction block groups may be referred to herein as pbFactor (e.g., prediction block group factor). In such instances, the video coder may calculate pbFactor by dividing the width of the CU by the width of a prediction block group. The width of a PBG may be predefined to have at least a width of a sample size of 4.

In some examples, the video coder may calculate pbFactor by dividing the subblock width (e.g., the prediction block width) by the width of the PBG (e.g., the minimum width of a PBG). For example, when the subblock has a width of 1 or 2, the video coder may calculate pbFactor by dividing the subblock width by the width of the PBG, such as by dividing by four when the PBG has a sample width of four. In another example, when the width of the CU is 8 sample sizes and the prediction block group is 4 sample sizes, the video coder may calculate pbFactor to equal 2. That is, the number or quantity of PBGs for the CU may be equal to 2 PBGs.

In some examples, when the width of a prediction block is four or more, the prediction block width and the PBG width may have the same width. For example, a video coder may group a prediction block of width four into a PBG of width four. That is, a video coder may group a prediction block of width X into a single PBG of the same width, where X is greater than or equal to a predefined threshold number. In a non-limiting and illustrative example, the predefined threshold number may be four. In another illustrative example, the video coder may group a first prediction block of width four and a second prediction block of width eight into a single PBG of width eight. In such examples, the video coder may only include a portion of the second prediction block into the PBG group, such as by further partitioning the second prediction block in order to achieve a particular PBG group size. While various techniques of this disclosure discuss width size in certain contexts, the techniques of this disclosure are not so limited, and it will be understood that other constraints and/or considerations may similarly apply to the grouping of prediction blocks into PBGs. For example, the PBG may have a particular height limitation (e.g., a four sample size height) or in another example, a combination of height and width constraints and/or considerations may similarly apply to the grouping of prediction blocks into PBGs (e.g., a PBG may have a minimum H×W size of M×N, where M and N may not necessarily be equal.

As discussed above, the example method of FIG. 24 as described may be performed by one or more processors implemented in circuitry. The one or more processors may be included in a video encoder or in some examples, may be included in a video decoder.

Illustrative Examples of the Disclosure Include

Example 1: A method of coding video data, the method comprising: performing splitting of a coding unit (CU) of video data using intra sub-partition (ISP) to form a set of prediction blocks, the prediction blocks including at least a first prediction block and a second prediction block; grouping a plurality of prediction blocks from the set of prediction blocks into a first prediction block group (PBG); and reconstructing samples of prediction blocks included in the first PBG independently of samples of other prediction blocks included in the first PBG.

Example 2: A method according to Example 1, wherein grouping the plurality of the set of prediction blocks into the first PBG comprises grouping a first plurality of the set of prediction blocks into the first PBG, the method further comprising: grouping a second plurality of the set of prediction blocks into a second PBG, the second plurality of the set of prediction blocks and the first plurality of the set of prediction blocks including a non-overlapping set of prediction blocks; and reconstructing samples of prediction blocks included in the second PBG independently of samples of other prediction blocks included in the second PBG.

Example 3: A method according to Example 2, wherein reconstructing samples of prediction blocks included in the second PBG comprises reconstructing samples of prediction blocks included in the second PBG based on samples of the prediction blocks included in the first PBG.

Example 4: A method according to any of Examples 1 through 3, wherein the first PBG comprises a sample size width of at least four.

Example 5: A method according to any of Examples 1 through 4, wherein a first transform block associated with the first PBG has a size equal to the size of the first prediction block.

Example 6: A method according to any of Examples 1 through 5, wherein reconstructing samples of prediction blocks comprises: generating a prediction sample array having a width equal to an aggregated width of at least the first prediction block and the second prediction block.

Example 7: A method according to any of Examples 1 through 6, wherein the first prediction block comprises a sample width of less than or equal to two.

Example 8: A method according to Example 7, wherein the first prediction block and the second prediction block are of a same width.

Example 9: A method according to any of Examples 1 through 8, further comprising: determining a quantity of prediction block groups based on a width of the coding unit and a width of the first prediction block; coding the CU in accordance with the quantity of prediction block groups such that the CU comprises the quantity of prediction block groups.

Example 10: A method according to any of Examples 1 through 9, wherein the method is performed by one or more processors.

Example 11: A method according to any of Examples 1 through 10, further comprising: encoding, in a coded video bitstream, one or more syntax elements that represent prediction information for the CU of video data and one or more syntax elements that represent residual data for the CU of video data.

Example 12: A method according to any of Examples 1 through 11, further comprising: decoding, from a coded video bitstream, one or more syntax elements that represent prediction information for the CU of video data and one or more syntax elements that represent residual data for the CU of video data.

Example 13: A method according to any of Examples 1 through 12, wherein performing splitting of the CU includes splitting the CU using one or more of vertical splitting, horizontal splitting, or a combination of horizontal and vertical splitting.

Example 14: A device for coding video data, the device comprising one or more means for performing the methods of any of Examples 1 through 13. For example, the device of Example 14 may include a memory configured to store video data; and one or more processors implemented in circuitry and configured to: perform splitting of a coding unit (CU) of video data using intra sub-partition (ISP) to form a set of prediction blocks, the prediction blocks including at least a first prediction block and a second prediction block; group a plurality of prediction blocks from the set of prediction blocks into a first prediction block group (PBG); and reconstruct samples of prediction blocks included in the first PBG independently of samples of other prediction blocks included in the first PBG.

Example 15: A device according to Example 14, wherein to group the plurality of the set of prediction blocks into the first PBG, the one or more processors are configured to group a first plurality of the set of prediction blocks into the first PBG, and wherein the one or more processors are further configured to: group a second plurality of the set of prediction blocks into a second PBG, the second plurality of the set of prediction blocks and the first plurality of the set of prediction blocks including a non-overlapping set of prediction blocks; and reconstruct samples of prediction blocks included in the second PBG independently of samples of other prediction blocks included in the second PBG.

Example 16: A device according to Example 15, wherein to reconstruct samples of prediction blocks included in the second PBG, the one or more processors are configured to reconstruct samples of prediction blocks included in the second PBG based on samples of the prediction blocks included in the first PBG.

Example 17: A device according to any of Examples 14 through 16, wherein the first PBG comprises a sample size width of at least four.

Example 18: A device according to any of Examples 14 through 17, wherein a first transform block associated with the first PBG has a size equal to the size of the first prediction block.

Example 19: A device according to any of Examples 14 through 18, wherein to reconstruct the samples of prediction blocks, the one or more processors are configured to: generate a prediction sample array having a width equal to an aggregated width of at least the first prediction block and the second prediction block.

Example 20: A device according to any of Examples 14 through 19, wherein the first prediction block comprises a sample width of less than or equal to two.

Example 21: A device according to Example 20, wherein the first prediction block and the second prediction block are of a same width.

Example 22: A device according to any of Examples 14 through 21, wherein the one or more processors are further configured to: determine a quantity of prediction block groups based on a width of the coding unit and a width of the first prediction block; and code the CU in accordance with the quantity of prediction block groups such that the CU comprises the quantity of prediction block groups.

Example 23: A device according to any of Examples 14 through 22, wherein the one or more processors are included in a video encoder.

Example 24: A device according to any of Examples 14 through 23, wherein the one or more processors are included in a video decoder.

Example 25: A device according to any of Examples 14 through 24, wherein to perform splitting of the CU, the one or more processors are configured to split the CU using vertical splitting.

In some implementations, the above-described examples 1-13 and/or 14-25 can be implemented using a computer-readable storage medium storing instructions that when executed cause one or more processors of a device to perform some or all of the various operations. For example, a computer-readable storage medium can be provided storing instructions that when executed cause one or more processors of a device for decoding and/or encoding video data to: perform splitting of a coding unit (CU) of video data using intra sub-partition (ISP) to form a set of prediction blocks, the prediction blocks including at least a first prediction block and a second prediction block; group a plurality of prediction blocks from the set of prediction blocks into a first prediction block group (PBG); and reconstruct samples of prediction blocks included in the first PBG independently of samples of other prediction blocks included in the first PBG.

In some implementations, the above-described examples 1-13 and/or 14-25 can be implemented using an apparatus comprising one or more means for performing some or all of the various operations. For example, an apparatus for encoding video data includes: means for performing vertical splitting of a coding unit (CU) of video data using intra sub-partition (ISP) to form a set of prediction blocks, the prediction blocks including at least a first prediction block and a second prediction block; means for grouping a plurality of prediction blocks from the set of prediction blocks into a first prediction block group (PBG); and means for reconstructing samples of prediction blocks included in the first PBG independently of samples of other prediction blocks included in the first PBG.

Example 26: A method of coding video data, the method comprising: coding an indication of a performance of generalized prediction for a current coding block of video data;

splitting, based on the indication, the current coding block into one or more prediction blocks; defining, based on the one or more prediction blocks, one or more prediction block groups (PBGs); determining a coding order of the PBGs; and coding the PBGs in the coding order.

Example 27: A method according to Example 26, wherein coding the PBGs comprises: obtaining a predicted value for a sample in a current PBG based on available reference samples for the current PBG and an intra mode used for prediction.

Example 28: A method according to any of Examples 26 or 27, wherein: splitting the current coding block into one or more prediction blocks comprises splitting the current coding block into prediction blocks of size 4×N, only a vertical intra prediction mode is allowed for prediction of the prediction blocks and an indication of an intra prediction mode for the prediction blocks is not signaled in a bitstream that includes an encoded representation of the video data.

Example 29: A method according to any of Examples 26 through 28, wherein coding comprises decoding.

Example 30: A method according to any of Examples 26 through 28, wherein coding comprises encoding.

Example 31: A device for coding video data, the device comprising one or more means for performing the methods of any of Examples 26 through 30. For example, the device of Example 31 may include one or more processors configured to: code an indication of a performance of generalized prediction for a current coding block of video data; split, based on the indication, the current coding block into one or more prediction blocks; define, based on the one or more prediction blocks, one or more prediction block groups (PBGs); determine a coding order of the PBGs; and code the PBGs in the coding order.

Example 32: A device according to Example 31, wherein the one or more means comprise one or more processors implemented in circuitry.

Example 33: A device according to any of Examples 31 or 32, further comprising a memory to store the video data.

Example 34: A device according to any of Examples 31 through 33, further comprising a display configured to display decoded video data.

Example 35: A device according to any of Examples 31 through 34, wherein the device comprises one or more of a camera, a computer, a mobile device, a broadcast receiver device, or a set-top box.

Example 36: A device according to any of Examples 31 through 35, wherein the device comprises a video decoder.

Example 37: A device according to any of Examples 31 through 36, wherein the device comprises a video encoder.

In some implementations, the above-described examples 26-30 and/or 31-37 can be implemented using a computer-readable storage medium storing instructions that when executed cause one or more processors of a device to perform some or all of the various operations. For example, a computer-readable storage medium can be provided storing instructions that when executed cause one or more processors of a device for decoding and/or encoding video data to: code an indication of a performance of generalized prediction for a current coding block of video data; split, based on the indication, the current coding block into one or more prediction blocks; define, based on the one or more prediction blocks, one or more prediction block groups (PBGs); determine a coding order of the PBGs; and code the PBGs in the coding order.

In some implementations, the above-described examples 26-30 and/or 31-37 can be implemented using an apparatus comprising one or more means for performing some or all of the various operations. For example, an apparatus for encoding video data includes: means for coding an indication of the performance of generalized prediction for a current coding block of video data; means for splitting, based on the indication, the current coding block into one or more prediction blocks; means for defining, based on the one or more prediction blocks, one or more prediction block groups (PBGs); means for determining a coding order of the PBGs; and means for coding the PBGs in the coding order.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding, via a coded video bitstream, a first syntax element specifying whether a coding unit (CU) of video data is split using intra sub-partition (ISP);
coding, via the coded video bitstream and where the first syntax element specifies that the CU is split using ISP, a second syntax element specifying a split type for the CU; and
responsive to the split type being vertical split or horizontal split:
performing splitting of the CU to form a set of prediction blocks, the prediction blocks including at least a first prediction block and a second prediction block;
grouping a plurality of prediction blocks from the set of prediction blocks into a first prediction block group (PBG); and
reconstructing samples of prediction blocks included in the first PBG independently of samples of other prediction blocks included in the first PBG.

2. The method of claim 1, wherein grouping the plurality of the set of prediction blocks into the first PBG comprises grouping a first plurality of the set of prediction blocks into the first PBG, the method further comprising:
grouping a second plurality of the set of prediction blocks into a second PBG, the second plurality of the set of prediction blocks and the first plurality of the set of prediction blocks including a non-overlapping set of prediction blocks; and
reconstructing samples of prediction blocks included in the second PBG independently of samples of other prediction blocks included in the second PBG.

3. The method of claim 2, wherein reconstructing samples of prediction blocks included in the second PBG comprises reconstructing samples of prediction blocks included in the second PBG based on samples of the prediction blocks included in the first PBG.

4. The method of claim 1, wherein the first PBG comprises a sample size width of at least four.

5. The method of claim 1, wherein a first transform block associated with the first PBG has a size equal to the size of the first prediction block.

6. The method of claim 1, wherein reconstructing samples of prediction blocks comprises:
generating a prediction sample array having a width equal to an aggregated width of at least the first prediction block and the second prediction block.

7. The method of claim 1, wherein the first prediction block comprises a sample width of less than or equal to two.

8. The method of claim 7, wherein the first prediction block and the second prediction block are of a same width.

9. The method of claim 1, further comprising:
determining a quantity of prediction block groups based on a width of the coding unit and a width of the first prediction block;
coding the CU in accordance with the quantity of prediction block groups such that the CU comprises the quantity of prediction block groups.

10. The method of claim 1, wherein the method is performed by one or more processors.

11. The method of claim 1, further comprising:
encoding, in the coded video bitstream, one or more syntax elements that represent prediction information for the CU of video data and one or more syntax elements that represent residual data for the CU of video data.

12. The method of claim 1, further comprising:
decoding, from the coded video bitstream, one or more syntax elements that represent prediction information for the CU of video data and one or more syntax elements that represent residual data for the CU of video data.

13. A device for coding video data, the device comprising:
a memory configured to store video data; and
one or more processors implemented in circuitry and configured to:
code, via a coded video bitstream, a first syntax element specifying whether a coding unit (CU) of video data is split using intra sub-partition (ISP);
code, via the coded video bitstream and where the first syntax element specifies that the CU is split using ISP, a second syntax element specifying a split type for the CU; and
responsive to the split type being vertical split or horizontal split:
perform splitting of the CU to form a set of prediction blocks, the prediction blocks including at least a first prediction block and a second prediction block;
group a plurality of prediction blocks from the set of prediction blocks into a first prediction block group (PBG); and
reconstruct samples of prediction blocks included in the first PBG independently of samples of other prediction blocks included in the first PBG.

14. The device of claim 13, wherein to group the plurality of the set of prediction blocks into the first PBG, the one or more processors are configured to group a first plurality of the set of prediction blocks into the first PBG, and wherein the one or more processors are further configured to:
group a second plurality of the set of prediction blocks into a second PBG, the second plurality of the set of prediction blocks and the first plurality of the set of prediction blocks including a non-overlapping set of prediction blocks; and
reconstruct samples of prediction blocks included in the second PBG independently of samples of other prediction blocks included in the second PBG.

15. The device of claim 14, wherein to reconstruct samples of prediction blocks included in the second PBG, the one or more processors are configured to reconstruct samples of prediction blocks included in the second PBG based on samples of the prediction blocks included in the first PBG.

16. The device of claim 13, wherein the first PBG comprises a sample size width of at least four.

17. The device of claim 13, wherein a first transform block associated with the first PBG has a size equal to the size of the first prediction block.

18. The device of claim 13, wherein to reconstruct the samples of prediction blocks, the one or more processors are configured to:
generate a prediction sample array having a width equal to an aggregated width of at least the first prediction block and the second prediction block.

19. The device of claim 13, wherein the first prediction block comprises a sample width of less than or equal to two.

20. The device of claim 19, wherein the first prediction block and the second prediction block are of a same width.

21. The device of claim 13, wherein the one or more processors are further configured to:
determine a quantity of prediction block groups based on a width of the coding unit and a width of the first prediction block; and
code the CU in accordance with the quantity of prediction block groups such that the CU comprises the quantity of prediction block groups.

22. The device of claim 13, wherein the one or more processors are included in a video encoder.

23. The device of claim 13, wherein the one or more processors are included in a video decoder.

24. A non-transitory computer-readable storage medium having stored thereon instructions that, when executed, cause one or more processors to:
code, via a coded video bitstream, a first syntax element specifying whether a coding unit (CU) of video data is split using intra sub-partition (ISP);
code, via the coded video bitstream and where the first syntax element specifies that the CU is split using ISP, a second syntax element specifying a split type for the CU; and
responsive to the split type being vertical split or horizontal split:
perform splitting of the CU to form a set of prediction blocks, the prediction blocks including at least a first prediction block and a second prediction block;
group a plurality of prediction blocks from the set of prediction blocks into a first prediction block group (PBG); and
reconstruct samples of prediction blocks included in the first PBG independently of samples of other prediction blocks included in the first PBG.

25. An apparatus for coding video data, the apparatus including:
means for coding, via a coded video bitstream, a first syntax element specifying whether a coding unit (CU) of video data is split using intra sub-partition (ISP);
means for coding, via the coded video bitstream and where the first syntax element specifies that the CU is split using ISP, a second syntax element specifying a split type for the CU;
means for performing, responsive to the split type being vertical split or horizontal split, splitting of the CU to form a set of prediction blocks, the prediction blocks including at least a first prediction block and a second prediction block;
means for grouping, responsive to the split type being vertical split or horizontal split, a plurality of prediction blocks from the set of prediction blocks into a first prediction block group (PBG); and
means for reconstructing, responsive to the split type being vertical split or horizontal split, samples of prediction blocks included in the first PBG independently of samples of other prediction blocks included in the first PBG.

26. The method of claim 1, wherein the split type is one of: no split, vertical split, and horizontal split.

27. The method of claim 1, wherein the first syntax element comprises a intra_subpartitions_mode_flag syntax element, and wherein the second syntax element comprises a intra_subpartitions_split_flag syntax element.

28. The method of claim 1, wherein splitting the CU comprises:
splitting a transform block of the CU into the set of prediction blocks.

* * * * *